US012021796B2

(12) United States Patent
Han et al.

(10) Patent No.: US 12,021,796 B2
(45) Date of Patent: Jun. 25, 2024

(54) METHODS FOR MAXIMUM PERMISSIBLE EXPOSURE MITIGATION BASED ON NEW RADIO TIME DOMAIN DUPLEX CONFIGURATION

(71) Applicant: QUALCOMM Incorporated, San Diego, CA (US)

(72) Inventors: Junsheng Han, Sunnyvale, CA (US); Udara Fernando, San Diego, CA (US); Lin Lu, San Diego, CA (US); John Forrester, San Diego, CA (US); Mingming Cai, San Jose, CA (US); Tao Luo, San Diego, CA (US); Raghu Narayan Challa, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/442,360

(22) Filed: Jun. 14, 2019

(65) Prior Publication Data

US 2020/0021421 A1    Jan. 16, 2020

Related U.S. Application Data

(60) Provisional application No. 62/696,300, filed on Jul. 10, 2018.

(51) Int. Cl.
*H04L 5/14*       (2006.01)
*H04B 17/10*    (2015.01)
*H04W 74/00*   (2009.01)

(52) U.S. Cl.
CPC ............ *H04L 5/14* (2013.01); *H04B 17/102* (2015.01); *H04W 74/002* (2013.01)

(58) Field of Classification Search
CPC ....... H04L 5/14; H04B 17/102; H04W 74/002
See application file for complete search history.

(56) References Cited

U.S. PATENT DOCUMENTS

2011/0053527 A1    3/2011  Hunzinger
2011/0211503 A1*  9/2011  Che .................... H04W 72/042
                                                                   370/280

(Continued)

FOREIGN PATENT DOCUMENTS

CN          105359429 A     2/2016
WO     2017197096 A1     11/2017

OTHER PUBLICATIONS

International Search Report and Written Opinion—PCT/US2019/037519—ISA/EPO—dated Sep. 19, 2019.
Skyworks Solutions et al., "Output Power for NR SA and NSA Operation", 3GPP Draft, 3GPP TSG-RAN WG4 Meeting #82, R4-1701494 [NR] Output Power for NR SA and NSA Operation, (Continued)

*Primary Examiner* — Kevin M Cunningham
(74) *Attorney, Agent, or Firm* — Arent Fox, LLP

(57) ABSTRACT

In an aspect of the disclosure, a method, a computer-readable medium, and an apparatus are provided. In certain configurations, the apparatus may be a user equipment (UE). The apparatus may receive configuration information for UL and DL transmissions from another device such as a base station. The apparatus may determine a maximum duty cycle of the UL transmission based on the configuration information. Based on the determined UL maximum duty cycle, the apparatus may determine a transmit power limit for the UL transmission. In one aspect, the apparatus may determine the UL transmit power limit by dividing the power corresponding to a maximum permissible exposure (MPE) limit by the determined maximum UL duty cycle. The apparatus may leverage the forward knowledge of the UL duty cycle to transmit at a power level that complies with the MPE limit while avoiding the poor uplink range associated with static power back-off.

22 Claims, 14 Drawing Sheets

(56) References Cited

U.S. PATENT DOCUMENTS

| | | | |
|---|---|---|---|
| 2013/0039173 A1 | 2/2013 | Ehsan et al. | |
| 2014/0334355 A1* | 11/2014 | Ekpenyong | H04W 72/0446 370/280 |
| 2015/0003301 A1* | 1/2015 | He | H04W 36/02 370/280 |
| 2015/0326380 A1* | 11/2015 | Verbin | H04L 5/1469 370/252 |
| 2015/0358963 A1* | 12/2015 | Sawai | H04W 16/14 370/336 |
| 2016/0044672 A1* | 2/2016 | Quan | H04W 72/21 370/280 |
| 2017/0332333 A1* | 11/2017 | Santhanam | H04W 52/367 |
| 2019/0191393 A1* | 6/2019 | Kim | H04W 52/225 |
| 2019/0281504 A1* | 9/2019 | Su | H04W 52/28 |
| 2019/0349180 A1* | 11/2019 | Lu | H04L 5/0094 |
| 2019/0349885 A1* | 11/2019 | Koskela | H04W 68/005 |
| 2021/0195587 A1* | 6/2021 | Kaikkonen | H04L 5/0091 |

OTHER PUBLICATIONS

3rd Generation Partnership Project (3GPP), Mobile Competence Centre, 650, vol. RAN WG4, No. Athens, Greece, Feb. 13, 2017- Feb. 17, 2017, Feb. 12, 2017 (Feb. 12, 2017), XP051214513, 2 Pages, Retrieved from the Internet: URL:http://www.3gpp.org/ftp/Meetings_3GPP_SYNC/RAN4/Docs/ [retrieved on Feb. 12, 2017] the whole document.

Sprint: "Motivation for +29dBm HPUE Definition for LTE Band 41 and NR n41 Intra-band NSA, SA Mode and 2x2 UL MIMO", 3GPP Draft, 3GPP TSG-RAN4 #87, R4-1807786, 3rd Generation Partnership Project (3GPP), Mobile Competence Centre, 6, vol. RAN WG4, No. Busan, Korea, May 21, 2018- May 25, 2018, May 20, 2018 (May 20, 2018), XP051448882, 2 Pages, Retrieved from the Internet: URL:http://www.3gpp.org/ftp/Meetings%5F3GPP%5FSVNC/RAN4/Docs/ [retrieved on May 20, 2018] the whole document.

* cited by examiner

METHODS FOR MAXIMUM PERMISSIBLE EXPOSURE MITIGATION BASED ON NEW RADIO TIME DOMAIN DUPLEX CONFIGURATION

CROSS REFERENCE TO RELATED APPLICATION(S)

This application claims the benefit of U.S. Provisional Application Ser. No. 62/696,300, entitled "Methods for MPE Mitigation Based on NR TDD Configuration" and filed on Jul. 10, 2018, which is expressly incorporated by reference herein in its entirety.

BACKGROUND

Technical Field

The present disclosure relates generally to communication systems, and more particularly, to methods and systems for determining transmission power.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

Exposure limits are imposed to limit Radio Frequency (RF) radiation from wireless devices. For example, a Maximum Permissible Exposure (MPE) limit is imposed for wireless devices communicating above 6 GHz (e.g., mmW systems) when human tissue is near the antenna. With the high path loss in mmW systems, a higher Equivalent Isotropic Radiated Power (EIRP) may be desired, which may be achieved through beam steering. However, a mmW beam from a handheld device might violate an MPE limit when directed toward a person's body. Solutions to back-off the EIRP to be compliant with the MPE limit may impose severe restrictions on uplink link budget and/or impact the range.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As free space and other losses for mmW systems are much higher than in systems communicating in sub-6 carriers, a higher EIRP for transmissions is typically desired. A higher EIRP may be accomplished by using antenna arrays to steer the beam in a desired direction. While a user equipment design may practically operate at much lower than EIRP limits, there may be a problem in which a beam pointed towards a person's skin by handheld device could violate the MPE limits, even while meeting the EIRP limits.

Static power limits to ensure that MPE limits are met at all times could require substantial back-off in power, leading to a poor uplink range. 5G/NR systems operating in the mmW bands are expected to be deployed as a time domain duplex (TDD) system. 5G NR TDD systems may dynamically configure the time division of system resources to accommodate the uplink (UL) and downlink (DL) bandwidth requirements of wireless devices connected to a network. As presented herein, a wireless device may leverage the forward knowledge of the UL duty cycle to transmit at a power level that complies with the MPE limit while avoiding the poor uplink range associated with static power back-off.

The present disclosure provides techniques for alleviating the uplink budget and range problems. For example, disclosed techniques may enable a user equipment (UE) to set the transmit power limit taking into account the forward knowledge of the maximum UL duty cycle configured by the network. The network may configure the UE with a TDD pattern using a hierarchy of semi-static signaling that keeps the TDD pattern relatively constant at the frame level and dynamic signaling that may change the TDD pattern dynamically at the slot level. For example, the semi-static signaling may configure a cell specific TDD pattern to have a certain number of DL slots or symbols, a certain number of UL slots or symbols, and a certain number of flexible slots or symbols that may be converted into UL or DL slots or symbols by dynamic UE-specific signaling. The UE may determine a maximum UL duty cycle by assuming all the flexible slots or symbols will be allocated for UL transmissions in addition to the UL slots or symbols already allocated. The UE may, through MPE measurements or other means, have knowledge of the MPE power limit for a desired beam direction. The UE may determine the UL transmit power limit by dividing the MPE power limit by the determined maximum UL duty cycle. In some examples, when the TDD pattern changes, the UE may update the maximum UL duty cycle and/or the UL transmit power limit.

In an aspect of the disclosure, a method, a computer-readable medium, and an apparatus are provided. An example apparatus for wireless communication at a UE receives configuration information for UL and DL transmissions. The example apparatus also determines a maximum duty cycle of an UL transmission based on the configuration information. The example apparatus also determines a transmit power for the UL transmission based on the maximum duty cycle of the UL transmission.

In another aspect of the disclosure, a method, a computer-readable medium, and an apparatus are provided. An example apparatus for wireless communication at a base station transmits configuration information for UL and DL transmissions to a UE to allow the UE to determine a maximum duty cycle of the UL transmission. The example apparatus also receives an UL transmission, wherein the UL transmission is transmitted from the UE with a transmit power determined from the maximum duty cycle of the UL transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
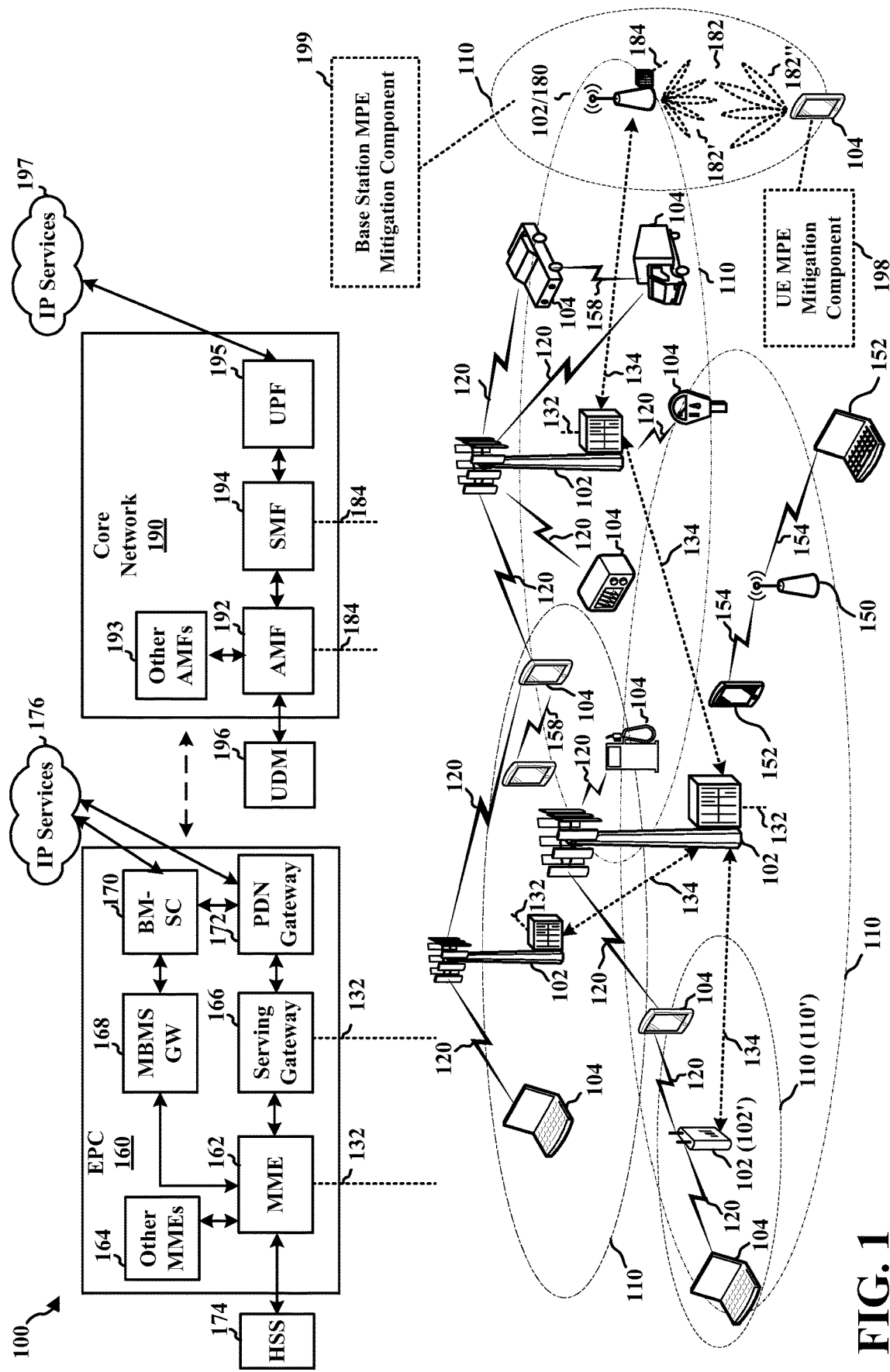
FIG. 1 is a diagram illustrating an example of a wireless communications system and an access network.
Figure 2:
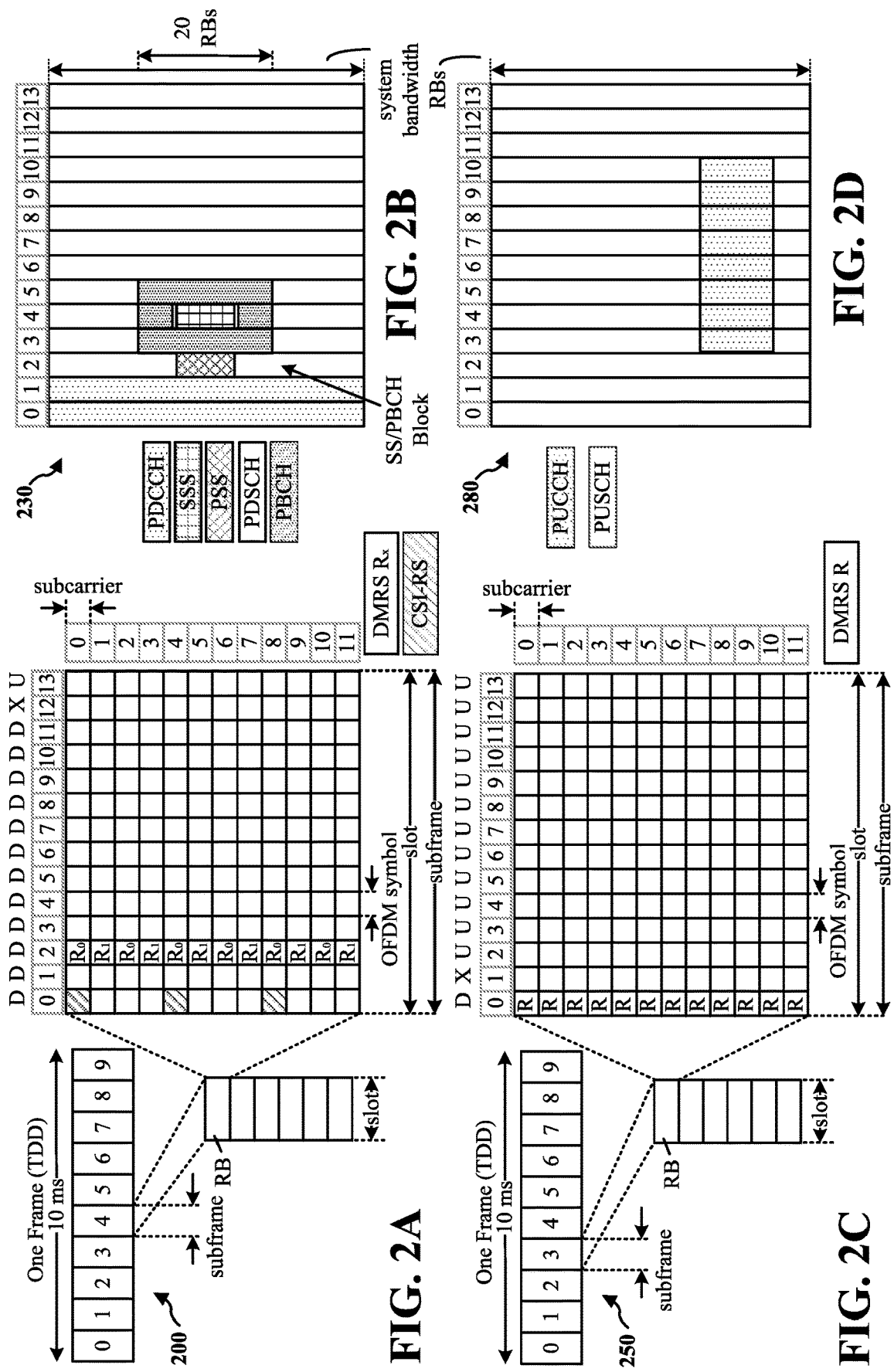
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The base station 180 may configure the UE 104 with a TDD pattern using a hierarchy of semi-static TDD signaling and dynamic TDD signaling. For example, the semi-static TDD signaling may configure a cell specific TDD pattern to have a certain number of DL slots or symbols, a certain number of UL slots or symbols, and a certain number of flexible slots or symbols that may be changed into UL or DL slots or symbols by dynamic UE-specific TDD signaling. In one aspect, instead of explicitly configuring an UL or DL slot or symbol, the base station 180 may transmit or receive signals through which a semi-static or periodic direction of transmission of the slots or symbols may be implied.

The UE 104 may use the hierarchy or combination of semi-static cell specific TDD configuration at a frame level, implied periodic or semi-static TDD configuration, dynamic UE specific TDD configuration at a slot level, and/or a knowledge of a periodicity of the TDD pattern to determine a TDD configuration for the next period of the TDD pattern. The UE 104 may use the TDD configuration to determine a maximum UL duty cycle for the next period of the TDD pattern.

Referring again to FIG. 1, in certain aspects, the UE 104 may be configured to manage one or more aspects of wireless communication by facilitating MPE mitigation based on NR TDD configuration. For example, the UE 104 may be configured to receive the hierarchy of TDD configuration information from the base station 180, to determine a maximum UL duty cycle for the next period of the TDD pattern, and to determine an UL transmit power limit based on the maximum UL duty cycle. The transmit power limit may be determined to comply with an MPE limit using the relationship that the MPE limit is the transmit power limit multiplied by the maximum UL duty cycle. The UE 104 may transmit UL data and control packets in the next period of the TDD pattern using the transmit power limit to comply with the MPE limit without sacrificing range, as described below in connection with any of FIGS. 2A to 11. The UL transmission may be transmitted from the UE 104 with a transmit power determined from the maximum UL duty cycle.

As an example, in FIG. 1, the UE 104 may include a UE MPE mitigation component 198 configured to receive configuration information for uplink (UL) and downlink (DL) transmissions. The UE MPE mitigation component 198 may also be configured to determine a maximum duty cycle of an UL transmission based on the configuration information. The UE MPE mitigation component 198 may also be configured to determine a transmit power for the UL transmission based on the maximum duty cycle of the UL transmission.

Still referring to FIG. 1, in certain aspects, the base station 180 may be configured to manage one or more aspects of wireless communication by facilitating MPE mitigation based on NR TDD configuration. For example, the base station 180 may be configured to transmit the hierarchy of TDD configuration information to the UE 104, and to receive an UL transmission(s) in the next period of the TDD pattern, as described below in connection with any of FIGS. 2A to 9 and/or 12 to 14.

As an example, in FIG. 1, the base station 180 may include base station MPE mitigation component 199 configured to transmit configuration information for uplink (UL) and downlink (DL) transmissions to a user equipment (UE) to allow the UE to determine a maximum duty cycle of the UL transmission. The base station MPE mitigation component 199 may also be configured to receive an UL transmission, wherein the UL transmission is transmitted from the UE with a transmit power determined from the maximum duty cycle of the UL transmission.

Although the following description is focused on uplink communications, it should be appreciated that the concepts described herein may be applicable to downlink communications and/or sidelink communications. Furthermore, although the following description may be focused on 5G/NR, the concepts described herein may be applicable to other similar areas, such as LTE, LTE-A, CDMA, GSM, and/or other wireless technologies, in which an MPE limit and/or a specific absorption rate (SAR) limit may be imposed on a wireless device. It should be appreciated that whether an MPE limit and/or an SAR limit may be imposed on a wireless device may depend on one or more parameters including, for example, type of the wireless device, transmission frequency range, type of wireless technology, physical orientation to a person, RF power level, and/or distance from a person.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A to 2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
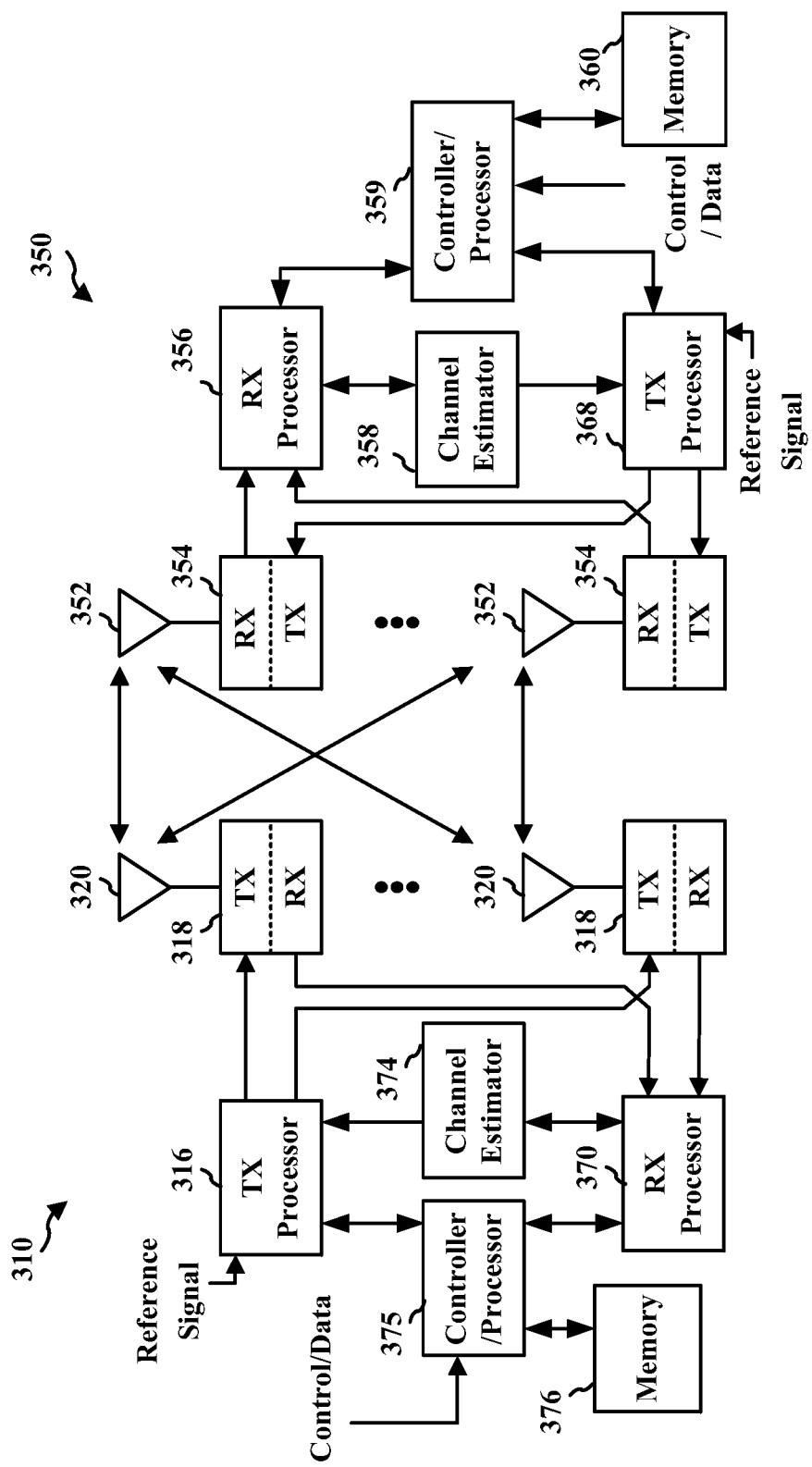
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with the UE MPE mitigation component 198 of FIG. 1.

At least one of the TX processor 316, the RX processor 370, and the controller/processor 375 may be configured to perform aspects in connection with the base station MPE mitigation component 199 of FIG. 1.

Figure 4:
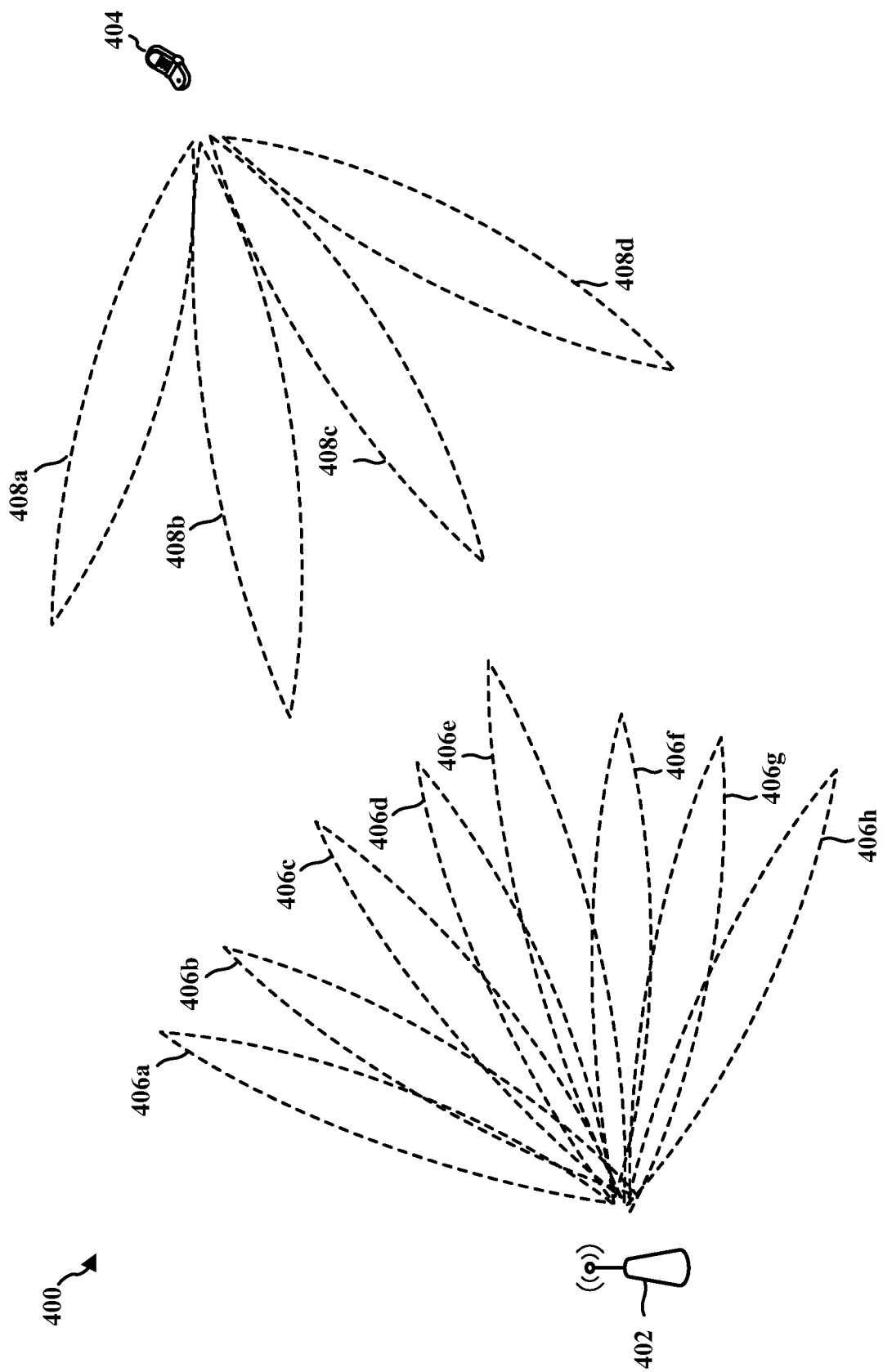
FIG. 4 is a diagram illustrating a base station in communication with a UE using beam steering, in accordance with certain aspects of the disclosure.

FIG. 4 is a diagram 400 illustrating a base station 402 in communication with a UE 404 using beam steering in accordance with certain aspects of the disclosure. Referring to FIG. 4, the base station 402 may transmit a beamformed signal to the UE 404 in one or more of the directions 406a, 406b, 406c, 406d, 406e, 406f, 406g, 406h. The UE 404 may receive the beamformed signal from the base station 402 in one or more receive directions 408a, 408b, 408c, 408d. The UE 404 may also transmit a beamformed signal to the base station 402 in one or more of the directions 408. The base station 402 may receive the beamformed signal from the UE 404 in one or more of the receive directions 406. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same. As free space and other loss for mmW systems are much higher than for sub-6 carrier systems, a higher EIRP for transmissions may be desired. In some examples, a higher EIRP may be obtained by using antenna arrays to steer a beam in a desired direction, e.g., as with the example beamforming described in connection with FIG. 4.

Figure 5B:
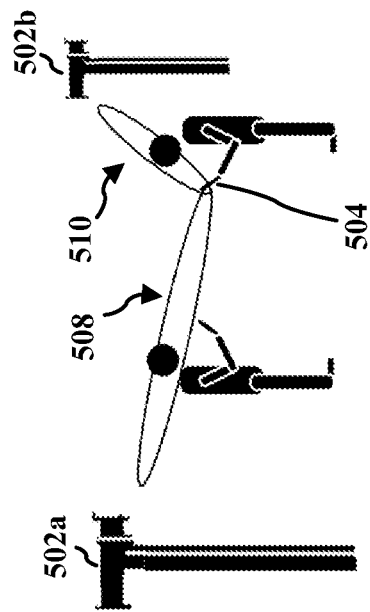
FIGS. 5A and 5B are diagrams illustrating RF exposure and an MPE limit in accordance with certain aspects of the disclosure.
Figure 5A:
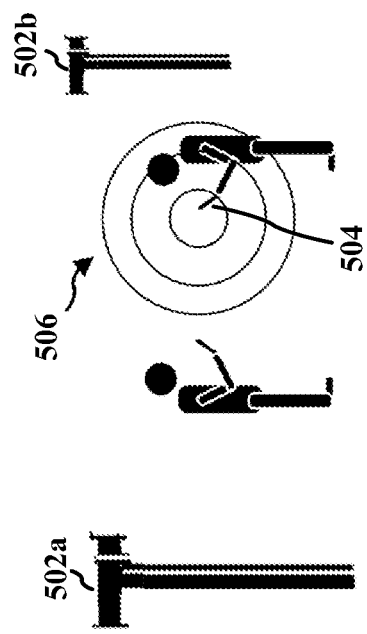

An MPE limit may be imposed for wireless devices communicating above 6 GHz. The MPE limit may be a regulatory metric for exposure based on area. For example, the MPE limit may be defined as a number (X) W/m2 averaged over a defined area and time averaged over a frequency dependent time window in order to prevent a human exposure hazard represented by a tissue temperature change. FIGS. 5A and 5B are diagrams illustrating RF exposure and an MPE limit in accordance with certain aspects of the disclosure. As shown in FIG. 5A, a handheld device 504 (such as the UE 104 of FIG. 1, the UE 350 of FIG. 3, and/or the UE 404 of FIG. 4) emits a transmission 506 that is close to isotropic. As shown in FIG. 5B, the handheld device 504 wirelessly communicates with base stations 502 using beam forming. For example, the handheld device 504 may wirelessly communicate with a first base station 502a using beam 508, and may wirelessly communicate with a second base station 502b using beam 510. In the illustrated examples, energy from the handheld device 504 may be concentrated in the beam direction (e.g., the beams 508, 510) through the use of multiple antenna elements transmitting in a manner to constructively add in a particular direction. Persons in the direction of the beams 508, 510 may be exposed to RF energy that exceeds the MPE limit. In some examples, the handheld device 504 may back-off in (e.g., reduce) the transmit power to ensure that the MPE limit is met. However, poor uplink range may result due to the reduced transmit power.

Because exposure limits may be based on an average amount of exposure for a defined time window, example techniques disclosed herein may leverage an averaging of the transmit power over a TDD period using an UL duty cycle to facilitate complying with the MPE limit. As a result, example techniques disclosed herein enable a UE to transmit at a higher maximum power limit for a short period time determined by the duty cycle within the averaging window of the TDD period so that the average power over the averaging window will be less than the MPE limit. The UE may, thus, leverage forward knowledge of the UL duty cycle to transmit at a power level that complies with the MPE limit while avoiding the poor uplink range associated with static power back-off.

Figure 6:
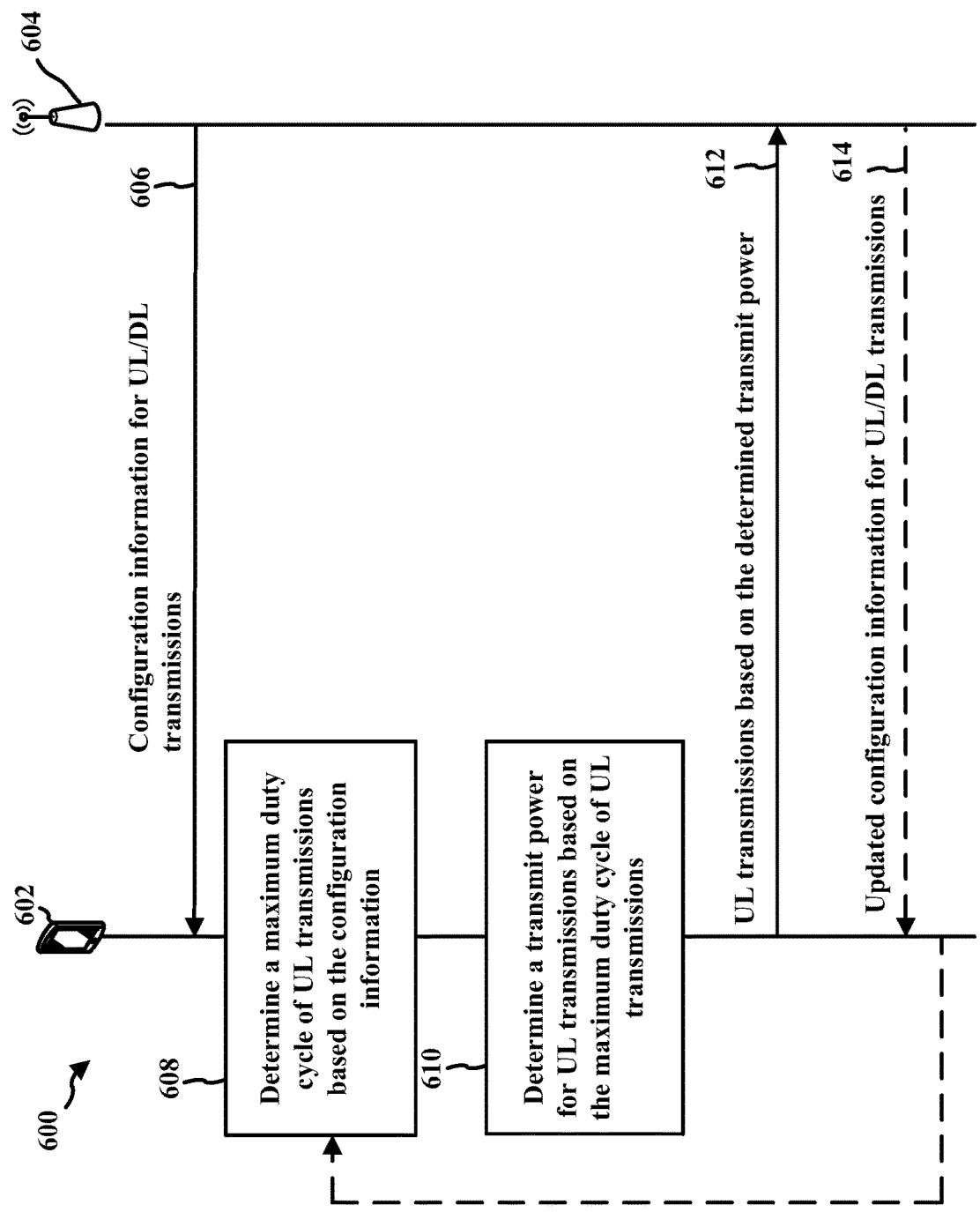
FIG. 6 is an example communication flow between a base station and a UE when the UE leverages a determined maximum UL duty cycle based on the TDD configuration information to determine a transmit power limit for UL transmissions, in accordance with the teachings disclosed herein

FIG. 6 illustrates an example of wireless communication 600 between a UE 602 and a base station 604 when the UE leverages a determined maximum UL duty cycle based on the TDD configuration information to determine a transmit power limit for UL transmissions, in accordance with certain aspects of the disclosure. One or more aspects of the UE 602 may be implemented by the UE 104 of FIG. 1, the UE 350 of FIG. 3, the UE 404 of FIG. 4, and/or the UE 504 of FIGS. 5A/5B. One or more aspects of the base station 604 may be implemented by the base station 102/180 of FIG. 1, the base station 310 of FIG. 3, the base station 402 of FIG. 4 and/or the base stations 502 of FIGS. 5A/5B.

It should be appreciated that while the wireless communication 600 includes one base station 604 in communication with one UE 602, in additional or alternative examples, the base station 604 may be in communication with any suitable quantity of UEs and/or other base stations, and/or the UE 602 may be in communication with any suitable quantity of base stations and/or other UEs. Thus, while certain of the transmissions between the base station 604 and the UE 602 are described as uplink transmissions and downlink transmissions, in other examples, any of the transmissions may additionally or alternatively be sidelink transmissions.

In the illustrated example of FIG. 6, the UE 602 may receive TDD configuration information 606 for UL and DL transmissions from the base station 604. The configuration information 606 may include signaling to configure a semi-static TDD pattern, signaling to configure a dynamic TDD pattern, and/or signaling from which the transmission direction may be implied. For example, in one aspect, the TDD configuration information 606 may include RRC signaling included in an SIB message that configures a semi-static cell-specific TDD pattern common for the UE 602 and/or other UEs in the cell. The TDD configuration information 606 for the semi-static cell-specific TDD pattern may include a periodicity of the DL and UL transmissions, a number of DL slots, a number of DL symbols, a number of UL slots, a number of UL symbols, and/or flexible slots or symbols that may be changed to UL or DL slots or symbols by dynamic TDD configuration signaling. In some examples, multiple (e.g., two or more) TDD patterns may be concatenated to form a longer TDD pattern.

In one aspect, the TDD configuration information 606 may include RRC signaling included in a UE specific message that configures a semi-static UE-specific TDD pattern. In some examples, the TDD configuration information 606 for the semi-static UE-specific TDD pattern may change one or more of the flexible slots or symbols allocated by the semi-static cell-specific TDD pattern to uplink slots or symbols. For example, the UE-specific configuration information may specify a number of DL symbols and a number of UL symbols for any of the one or more flexible slots. In some examples, the UE-specific configuration information may specify the number of UL and DL slots different from the number of UL and DL slots specified by the cell-specific configuration information.

In one aspect, the TDD configuration information 606 may include RRC signaling that configures a periodic or semi-static DL and UL TDD pattern implicitly rather than explicitly. For example, the RRC signaling itself may imply a semi-static or periodic direction of a slot or may contain information through which a semi-static or periodic direction of a slot may be implied.

In one aspect, the TDD configuration information 606 may include a slot format indicator (SFI) included in a DCI message that dynamically specifies the number of UL symbols, the number of DL symbols, the number of flexible symbols, and the arrangement of the UL, DL, and flexible symbols on a slot-by-slot basis. In some examples, the SFI may be changed more often than the semi-static cell-specific or UE-specific TDD pattern of the RRC signaling to satisfy the UL and DL data bandwidth requirement of the UE 602.

In one aspect, the TDD configuration information 606 may include signaling included in a cell radio network temporary identifier (C-RNTI) or DCI message that dynamically configures a DL and UL TDD pattern implicitly rather than explicitly. For example, the C-RNTI or DCI message may imply a direction of transmission of the symbol through grants and signal configuration such as CSI-RS or SRS.

The UE 602 may use the hierarchy or combination of a semi-static cell-specific or UE-specific explicit TDD pattern at a frame level received through RRC signaling, an implied periodic or semi-static TDD pattern received through RRC signaling, a dynamic UE-specific explicit TDD pattern at a slot level received through SFI in DCI, an implied dynamic UE-specific TDD pattern received through signal configuration of the DCI or C-RNTI, and a knowledge of a periodicity of the TDD pattern to determine a TDD configuration for the next period of the TDD pattern.

Figure 8:
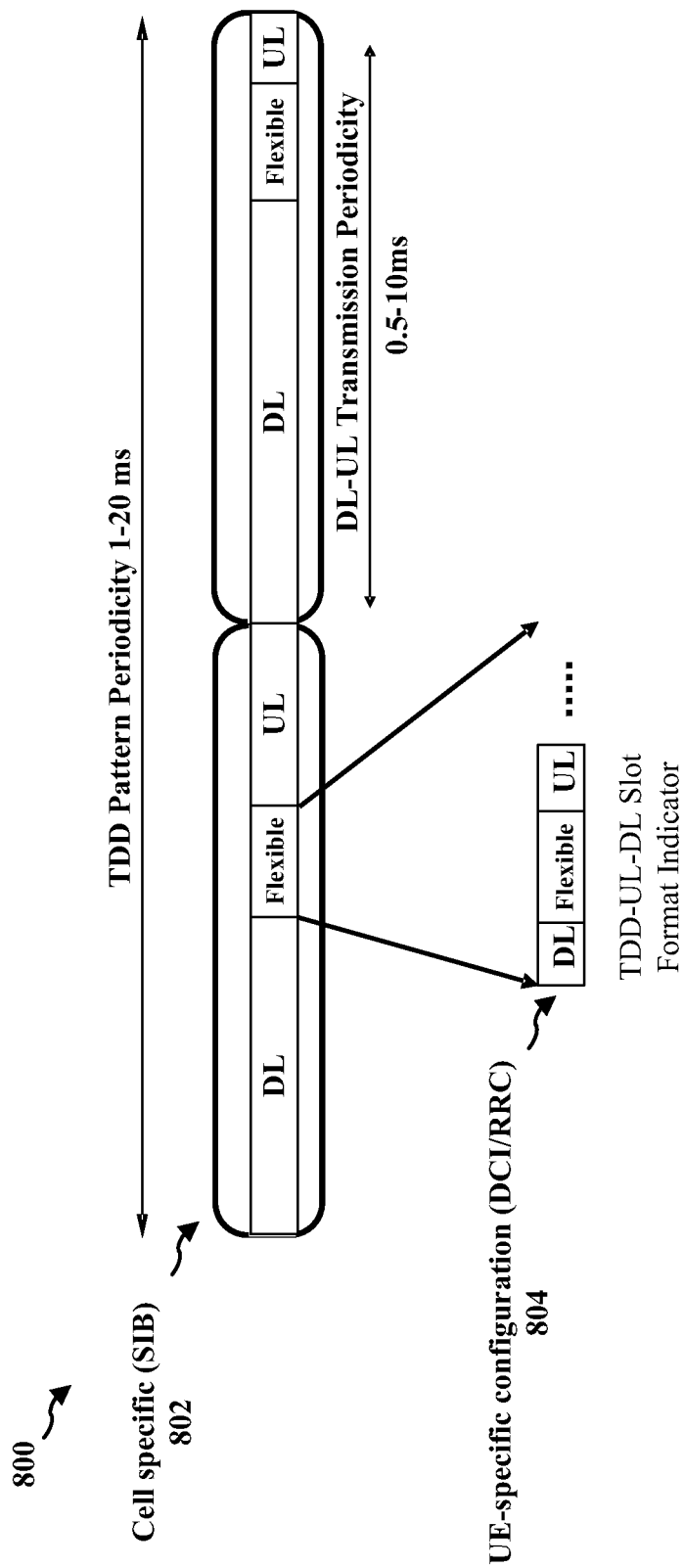
FIG. 8 illustrates a TDD pattern with a periodicity that shows a DL allocation of symbols, an UL allocation of symbols, and a flexible allocation portion that may be converted into UL or DL transmissions, in accordance with certain aspects of the disclosure.

FIG. 8 illustrates a TDD pattern 800 with a periodicity that shows a DL allocation of symbols, an UL allocation of symbols, and a flexible allocation portion that may be converted into UL or DL transmissions in accordance with certain aspects of the disclosure. A semi-static cell-specific TDD pattern 802 received through SIB in RRC signaling may include two TDD sub-patterns that are concatenated. Each TDD sub-pattern may have a transmission periodicity of 0.5 to 10 ms. In some examples, the concatenated TDD sub-patterns may yield a TDD pattern with a periodicity of 1 to 20 ms. In some examples, the TDD pattern periodicity may be divisible by (e.g., a submultiple of) 20 ms.

The TDD sub-pattern may indicate a number of DL slots, a number of flexible slots following the DL slots in which the flexible slots may be changed to UL or DL slots or symbols through other RRC signaling or DCI, and a number of UL slots following the flexible slots. The number of DL slots, flexible slots, and UL slots may be different between the two TDD sub-patterns. In one aspect, the flexible slot may be configured to have a semi-static UE-specific TDD pattern through RRC signaling or a dynamic UE-specific TDD pattern through SFI of DCI messages. A flexible slot may be configured to have a number of DL symbols, a number of flexible symbols that may subsequently be changed to DL or UL symbols, and a number of UL symbols as shown in a flexible slot TDD pattern 804. In some examples, the UE-specific configuration may additionally or alternatively be provided via RRC signaling (e.g., "TDD-UL-DL-ConfigDedicated"). In some examples, the multiple flexible slots may be configured independently so that the flexible slots have their own flexible slot TDD patterns.

Referring back to FIG. 6, at 608, the UE 602 determines (or predicts or infers) a maximum UL duty cycle based on the configuration information. In one aspect, the UE 602 may determine a maximum UL duty cycle for the next TDD pattern periodicity by assuming all the flexible slots or flexible symbols will be allocated for UL transmissions in addition to the UL slots or symbols already allocated. The actual UL duty cycle may be less than the maximum UL duty cycle if some of the flexible slots or symbols remain flexible or are changed to DL slots or symbols by UE-specific RLL signaling or through the SFI of DCI messages. However, because a user's exposure to the UL transmit power may be based on an average amount of exposure over the TDD pattern periodicity, a maximum transmit power level calculated based on the maximum UL duty cycle to meet the MPE limit may facilitate that the actual exposure will be less than the MPE limit when the actual UL duty cycle is less than the maximum UL duty cycle.

In one aspect, the UE 602 may utilize Equation 1 (below) to determine a maximum UL duty cycle.

$$\text{Maximum UL duty cycle} = (UL+\text{Flexible})/(UL+\text{Flexible}+DL) \quad \text{(Equation 1)}$$

In Equation 1, "UL," "DL," and "Flexible" represent the number of UL, DL, and flexible symbols over the TDD pattern periodicity. In one aspect, transition gaps between the UL and DL symbols may be taken into account in the denominator of Equation 1 to reduce the maximum UL duty cycle since there may be no UL transmission during the transition gaps.

In one aspect, if the TDD pattern includes two concatenated TDD sub-patterns as shown in FIG. 8, the UE 602 may calculate the maximum UL duty cycle for the two TDD sub-patterns separately if separate maximum transmit power for the periodicities of the two TDD sub-patterns is desired. In one aspect, the UE 602 may calculate the maximum UL duty cycle for the periodicity of the entire TDD pattern and may apply the maximum transmit power for the periodicity of the entire TDD pattern.

At 610, the UE 602 determines a maximum transmit power for UL transmission based on the maximum UL duty cycle and the MPE limit. As mentioned, a user's exposure to the UL transmit power may be based on an average amount of exposure over the TDD pattern periodicity. In certain such examples, the UE 602 may express the transmit power corresponding to the MPE limit using Equation 2 (below).

$$P\_limit = P\_max * DC \quad \text{(Equation 2)}$$

In Equation 2, "P_limit" represents the power limit corresponding to the MPE limit, "P_max" represents the maximum UL transmit power, and "DC" represents the maximum UL duty cycle from Equation 1. The UE 602 may then calculate the maximum UL transmit power using Equation 3 (below).

$$P\_max = P\_limit/DC \qquad \text{(Equation 3)}$$

As such, a maximum UL duty cycle of 25% may yield a maximum UL transmit power that is 6 dB higher than the power corresponding to the MPE limit, allowing the UL transmission range to be doubled assuming squared propagation loss compared to transmitting the UL at the power corresponding to the MPE limit.

The UE 602 may transmit the UL transmissions 612 during the next TDD pattern periodicity at a power level equal to or less than the calculated maximum UL transmit power to ensure that a user's exposure does not exceed the MPE limit. In some examples, the base station 604 may transmit updated TDD configuration information 614 for UL and DL transmissions. For example, the base station 604 may change the flexible slot TDD pattern to change the number of UL and DL symbols in the flexible slot for the next TDD pattern periodicity or the base station 604 may change the SFI through the DCI for a slot in the current TDD pattern periodicity.

In some examples, the UE 602 may update, at 608, the maximum UL duty cycle for the current or the next TDD pattern periodicity based on the changed TDD configuration information 614. In one aspect, if the TDD pattern for the current periodicity is changed, the UE 602 may consider the UL energy transmitted prior to the change of the TDD pattern in the current TDD periodicity when the UE 602 updates the maximum UL duty cycle for the remaining portion of the current TDD periodicity. For example, assume prior to the change of the TDD pattern in the current periodicity, the duty cycle of the UL symbols already transmitted is lower than the maximum UL duty cycle calculated for the entire TDD pattern periodicity because the UL symbols are not equally distributed throughout the entire TDD pattern periodicity. The UE 602 may take this into account when it updates the maximum UL duty cycle for the remaining portion of the TDD pattern periodicity such as by making the maximum duty cycle lower than what it otherwise would be based on the changed TDD configuration information. The result may be an increase in the maximum transmit power in the remaining portion of the TDD pattern to compensate for the lower transmitted energy prior to the change of the TDD pattern so that the average transmitted power over the entire TDD pattern periodicity meets the MPE limit.

The UE 602 may then re-determine, at 610, the maximum UL transmit power based on the updated maximum UL duty cycle. For example, when the TDD configuration information reduces the number of UL slots or symbols, the maximum UL duty cycle may decrease. The maximum UL transmit power may be higher, resulting in an increase in the UL transmission range while still satisfying the MPE limit. Thus, the UE 602 may leverage forward knowledge of the UL duty cycle to transmit at a power level that complies with the MPE limit while avoiding the poor uplink range associated with static power back-off.

Figure 7:
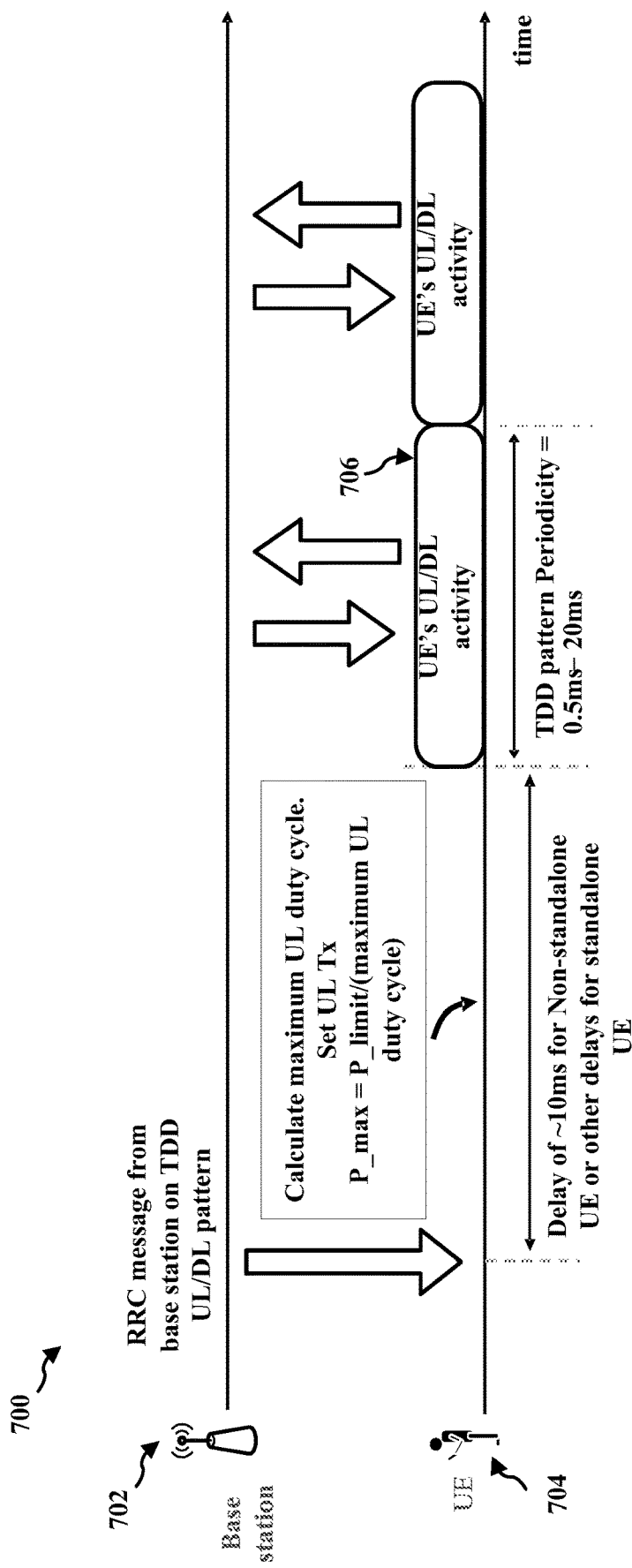
FIG. 7 illustrates a timeline of a base station configuring a UE with a TDD pattern and the UE calculating a determined maximum UL duty cycle to determine a transmit power limit for UL transmissions, in accordance with certain aspects of the disclosure.

FIG. 7 illustrates a timeline 700 of a base station 702 configuring a UE 704 with a TDD pattern and the UE 704 determining a maximum UL duty cycle to determine a transmit power limit for UL transmissions, in accordance with certain aspects of the disclosure.

In some examples, the base station 702 may transmit TDD configuration information such as RRC signaling in an SIB message that configures a semi-static cell-specific TDD pattern for the UE 704. The base station 702 may also transmit an RRC message to configure a semi-static UE-specific TDD pattern that changes some of the flexible slots or symbols allocated by the semi-static cell-specific TDD pattern to uplink slots or symbols. In the illustrated example, a TDD pattern 706 may have a periodicity of 0.5 to 20 ms. In one aspect, the TDD pattern 706 may include two or more TDD sub-patterns that are concatenated. In certain such examples, each of the TDD sub-patterns may have a transmission periodicity of 0.5 to 10 ms. For example, two concatenated TDD sub-patterns may yield a TDD pattern with a periodicity of 1 to 20 ms.

The TDD configuration information may configure the TDD pattern 706 for the next periodicity during the TDD pattern for a current periodicity. The delay from the receipt of the TDD configuration information to the start of the TDD pattern 706 for the next periodicity may be 10 ms for a non-standalone UE or other delays for a standalone UE. During this time, the UE 704 may calculate a maximum UL duty cycle for the TDD pattern 706 for the next periodicity using Equation 1 (above) as described. In some examples, the UE 704 may calculate a maximum transmit power for the TDD pattern 706 for the next periodicity based on the maximum UL duty cycle using Equation 3 (above) as described.

In some examples, during the TDD pattern 706 for the next periodicity, the UE 704 may transmit UL data or control packets at a power level equal to or less than the maximum transmit power to ensure compliance with the MPE limit. If the TDD configuration information changes the TDD pattern 706 for the current periodicity or the TDD pattern for the next periodicity, the UE 704 may update the maximum UL duty cycle for the current periodicity or the next periodicity. In one aspect, if the TDD pattern 706 for the current periodicity is changed, the UE 704 may consider the UL energy transmitted prior to the change of the TDD pattern 706 in the current TDD periodicity when the UE 704 updates the maximum UL duty cycle for the remaining portion of the current TDD periodicity. In one aspect, if there is no update to the TDD configuration information, the UE 704 may assume the current maximum UL duty cycle for the TDD pattern for the next periodicity. The UE 704 may transmit the data or control packets for the next TDD periodicity at the same transmit power as that for the current TDD periodicity.

Figure 9:
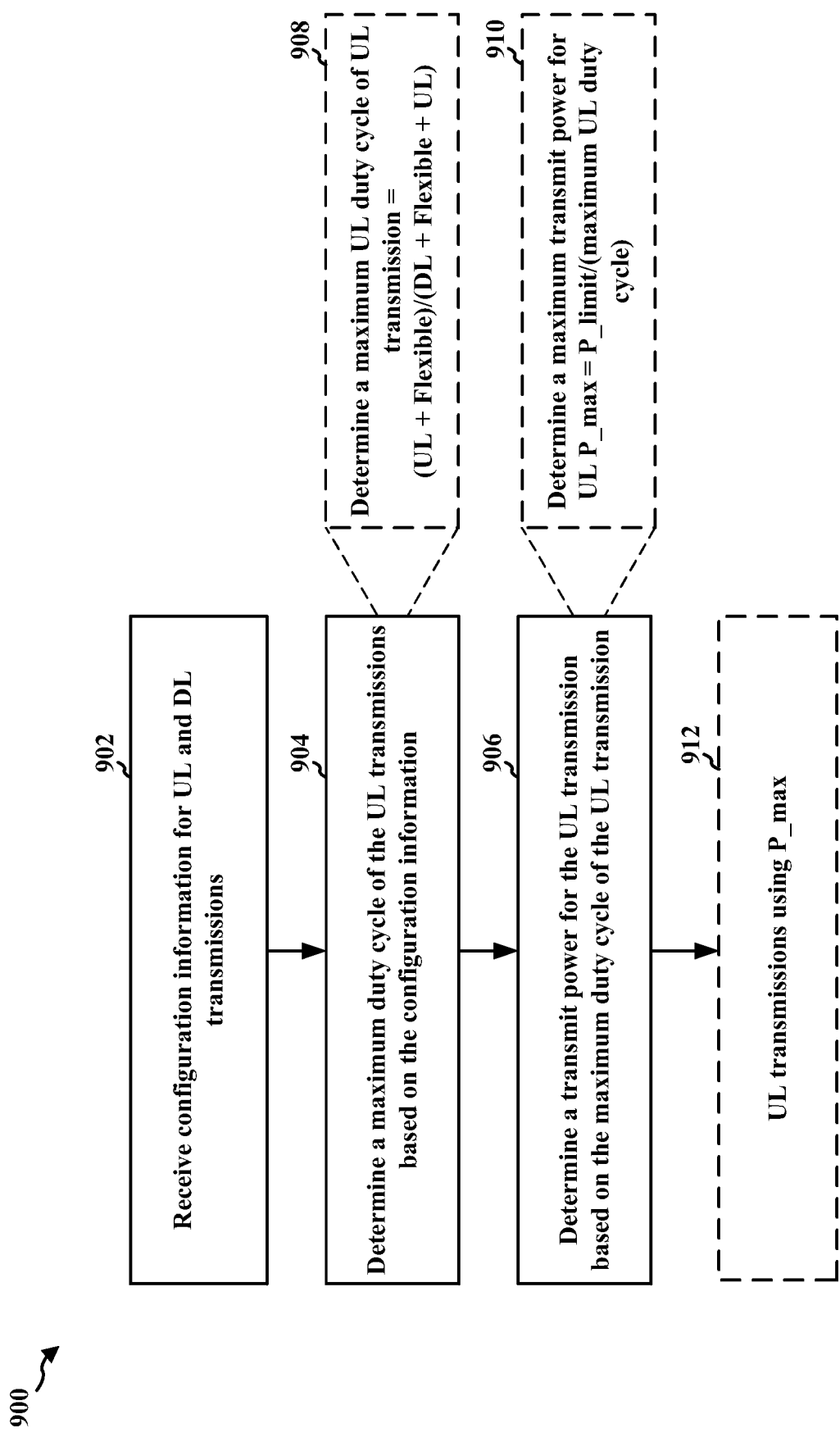
FIG. 9 is a flowchart of a method of wireless communication that may be implemented by a UE, in accordance with certain aspects of the disclosure.

FIG. 9 is a flowchart 900 of a method of wireless communication. The method 900 may be implemented by a UE (e.g., the UE 104, the UE 350, the UE 404, the UE 504, the UE 602, the UE 1350, the apparatus 1002/1002', and/or the processing system 1114, which may include the memory 360 and which may be the entire UE 350 or a component of the UE 350, such as the TX processor 368, the RX processor 356, and/or the controller/processor 359), in accordance with certain aspects of the disclosure. The method may be performed by the UE of 104, 350, 404, 602, 704, 1000, or the apparatus 1102'. Optional aspects are illustrated with a dashed line. The example flowchart 900 of FIG. 9 facilitates a UE operating in accordance with an MPE limit and, thereby, alleviating uplink budget problems and/or range problems.

At 902, the UE may receive TDD configuration information for UL and DL transmissions. For example, a configuration information for UL and DL transmission component 1004 of apparatus 1002 may facilitate the receiving of the TDD configuration information for UL and DL. In one aspect, the TDD configuration information may be received from a base station. The configuration information may include signaling to configure a semi-static TDD pattern, to configure a dynamic TDD pattern, or signaling from which the transmission direction may be implied. For example, in one aspect, the TDD configuration information may include RRC signaling included in a SIB message that configures a semi-static cell-specific TDD pattern common for the UE 602 and other UEs in the cell. The configuration information for the semi-static cell-specific TDD pattern may include a periodicity of the DL and UL transmissions, a number of DL slot, a number of DL symbols, a number of UL slots, and flexible slots or symbols that may be changed to UL or DL slots or symbols by dynamic TDD configuration signaling.

In one aspect, the TDD configuration information may include RRC signaling included in a UE specific message that configures a semi-static UE-specific TDD pattern. The configuration information for the semi-static UE-specific TDD pattern may change the flexible slots or symbols allocated by the semi-static cell-specific TDD pattern to uplink slots or symbols.

In one aspect, the TDD configuration information may include RRC signaling that configures a periodic or semi-static DL and UL TDD pattern implicitly rather than explicitly. In one aspect, the TDD configuration may include a slot format indicator (SFI) included in a DCI message that dynamically specifies the number of UL symbols, the number of DL symbols, the number of flexible symbols, and the arrangement of the UL, DL, and flexible symbols on a slot-by-slot basis. In one aspect, the TDD configuration may include signaling included in a cell radio network temporary identifier (C-RNTI) or DCI message that dynamically configures a DL and UL TDD pattern implicitly rather than explicitly.

At 904, the UE may determine (or predict or infer) a maximum UL duty cycle based on the configuration information. For example, a maximum UL duty cycle determination component 1006 may facilitate the determining of the maximum UL duty cycle. In one aspect, the UE 602 may determine a maximum UL duty cycle for the next TDD pattern periodicity by assuming all the flexible slots or flexible symbols will be allocated for UL transmissions in addition to the UL slots or symbols already allocated.

For example, at 908, the UE may determine a maximum UL duty cycle by first calculating a sum of the UL symbols and flexible symbols for the current TDD pattern periodicity to determine the maximum number of UL symbols. The UE may then calculate a sum of the DL symbols, the flexible symbols, and the UL symbols to determine the total number of symbols in the current TDD pattern periodicity. The UE may then determine a maximum UL duty cycle by dividing the maximum number of UL symbols by the total number of symbols. In one aspect, transition gaps between the UL and DL symbols may be taken into account to reduce the maximum UL duty cycle since there will be no UL transmission during the transition gaps.

In one aspect, if the TDD pattern includes two concatenated TDD sub-patterns as shown in FIG. 8, the UE 602 may calculate the maximum UL duty cycle for the two TDD sub-patterns separately if separate maximum transmit power for the periodicities of the two TDD sub-patterns is desired. In one aspect, the UE may calculate the maximum UL duty cycle for the periodicity of the entire TDD pattern and may apply the maximum transmit power for the periodicity of the entire TDD pattern. However, it should be appreciated that the TDD pattern may include any suitable quantity of concatenated TDD sub-patterns.

At 906, the UE may determine a transmit power for the UL transmission based on the maximum UL duty cycle. For example, a transmit power determination component 1008 may facilitate the determining of the transmit power for the UL transmission based on the maximum UL duty cycle. The UE may determine the transmit power based on an average of power exposure over the TDD pattern periodicity to meet a MPE limit or EIRP limit. In other aspects, the UE may determine the transmit power to meet other regulatory or safety transmit power requirements.

For example, at 910, the UE may determine a maximum transmit power for UL transmission by dividing the power corresponding to the MPE limit by the maximum UL duty cycle (calculated at 904-). In some examples, a lower UL duty cycle may allow a higher UL transmit power so that the average transmit power over the duration of the TDD pattern periodicity still meets the MPE limit.

At 912, the UE may transmit the UL transmission during the net TDD pattern periodicity at a power level equal to or less than the calculated maximum UL transmit power. In one aspect, if the TDD pattern includes two concatenated TDD sub-patterns and the UE calculates the maximum duty cycle and the maximum transmit power for the two TDD sub-patterns separately, the UE may transmit the UL transmission with a separate transmit power for the periodicities of the two separate TDD sub-patterns.

Figure 10:
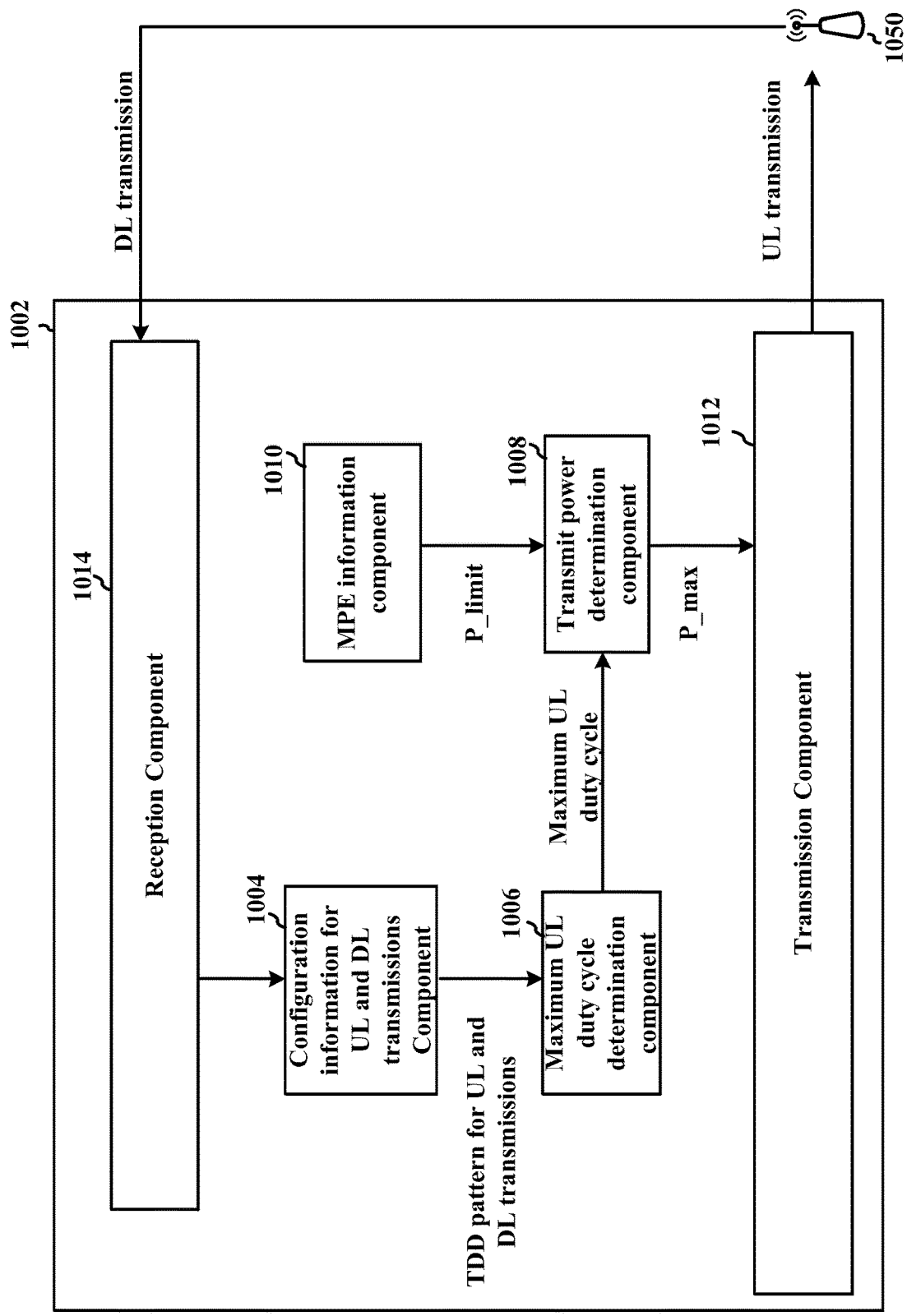
FIG. 10 is a conceptual data flow diagram illustrating the data flow between different means/components in an exemplary apparatus of a UE, in accordance with certain aspects of the disclosure.

FIG. 10 is a conceptual data flow diagram 1000 illustrating the data flow between different means/components in an example apparatus 1002 in communication with a base station 1050. The apparatus 1002 may be a UE. The apparatus 1002 may perform the method of flowchart 900. The apparatus 1002 includes a configuration information for UL and DL transmission component 1004, a maximum UL duty cycle determination component 1006, a transmit power determination component 1008, an MPE information component 1010, a transmission component 1012, and a reception component 1014. The base station 1050 may include the same or similar components as shown with respect to the base station 102/180 of FIG. 1, the base station 310 of FIG. 3, the base station 402 of FIG. 4, and/or the base station 604 of FIG. 6.

The configuration information for UL and DL transmission component 1004 may be configured to receive the TDD configuration for UL and DL transmissions through the reception component 1014 (e.g., as described in connection with 902). In some examples, the base station 1050 may transmit the TDD configuration information in the DL transmission. The TDD configuration may include a hierarchy of combination of configuration information that configure a semi-static cell-specific or UE-specific explicit TDD pattern at a frame level received through RRC signaling, an implied periodic or semi-static TDD pattern received through RRC signaling, a dynamic UE-specific explicit TDD pattern at a slot level received through SFI in DCI, an implied dynamic UE-specific TDD pattern received through signal configuration of the DCI or C-RNTI. The configuration information for the semi-static cell-specific TDD pattern may include a periodicity of the DL and UL transmissions, a number of DL slot, a number of DL symbols, a number of UL slots, and flexible slots or symbols that may be changed to UL or DL slots or symbols by dynamic TDD configuration signaling. The configuration information for UL and DL transmission component 1004 may be configured to generate the TDD pattern for UL and DL transmission for the next or the current TDD pattern periodicity.

The maximum UL duty cycle determination component 1006 may be configured to determine a maximum UL duty cycle based on the TDD pattern for UL and DL transmission received from the configuration information for UL and DL transmission component 1004 (e.g., as described in connection with 904 and/or 908). In one aspect, the maximum UL duty cycle determination component 1006 may be configured to determine a maximum UL duty cycle for the next TDD pattern periodicity by assuming all the flexible slots or flexible symbols will be allocated for UL transmissions in addition to the UL slots or symbols already allocated. The maximum UL duty cycle determination component 1006 may be configured to generate a maximum UL duty cycle.

The transmit power determination component 1008 may be configured to determine a maximum transmit power P_max for the UL transmission based on the maximum UL duty cycle received from the maximum UL duty cycle determination component 1006 and the power P_limit corresponding to the MPE limit supplied from the MPE information component 1010 (e.g., as described in connection with 906 and/or 910). In one aspect, the transmit power determination component 1008 may be configured to determine P_max by dividing P_limit by the maximum UL duty cycle. The transmit power determination component 1008 may be configured to transmit the UL transmission during the net TDD pattern periodicity at a power level equal to or less than P_max through the transmission component 1012 for UL transmission to the base station 1050.

The reception component 1014 may be configured to receive various types of signals/messages and/or other information from other devices, including, for example, the base station 1050. The messages/information may be received via the reception component 1014 and provided to one or more components of the apparatus 1002 for further processing and/or use in performing various operations. For example, the reception component 1014 may be configured to receive signaling including, for example, downlink transmissions.

The transmission component 1012 may be configured to transmit various types of signals/messages and/or other information to other devices, including, for example, the base station 1050. For example, the transmission component 1012 may be configured to transmit an uplink transmission using the uplink transmit power (e.g., as described in connection with 912).

The apparatus 1002 may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
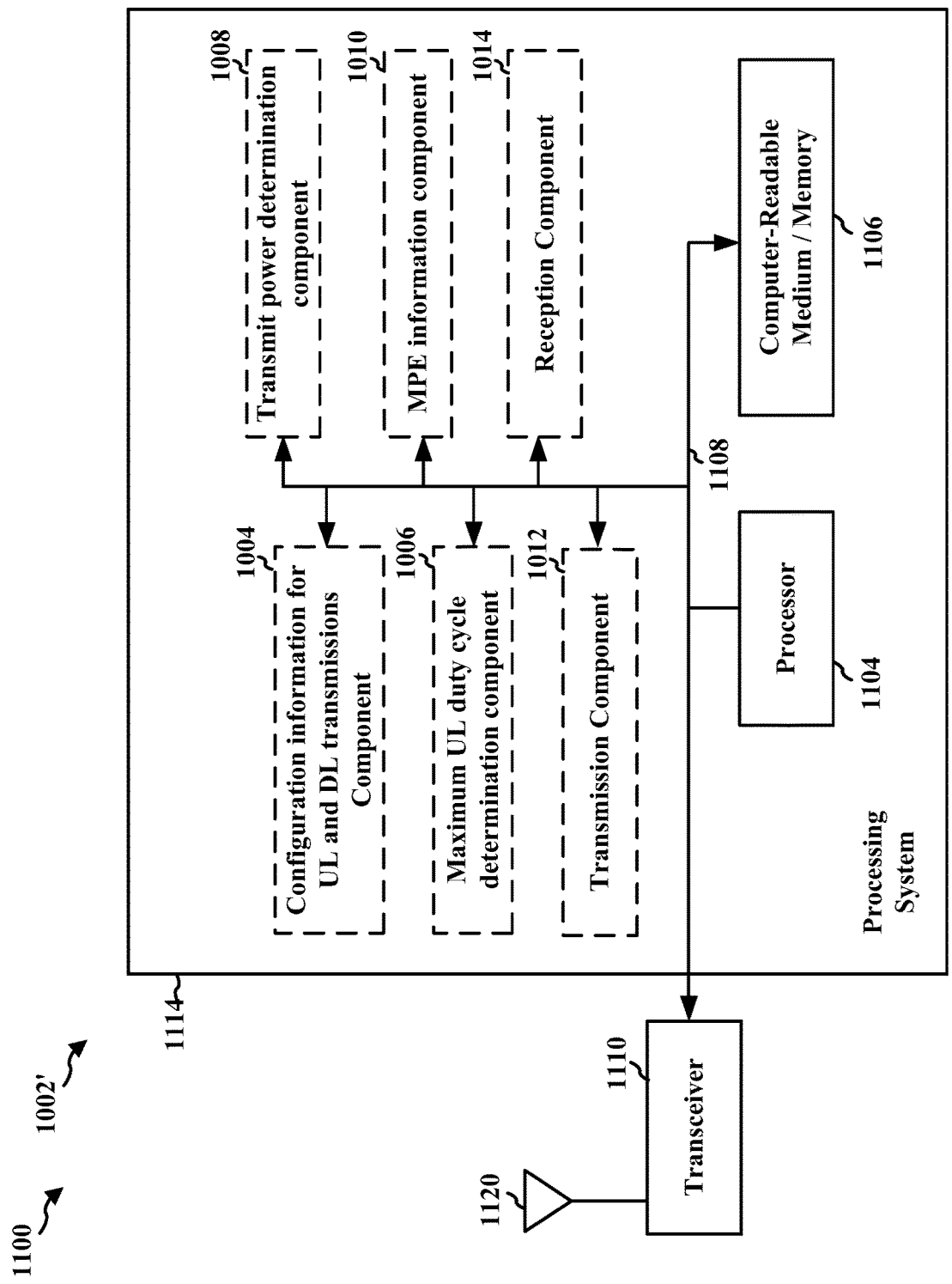
FIG. 11 is a diagram illustrating an example of a hardware implementation for an apparatus of a UE employing a processing system, in accordance with certain aspects of the disclosure.

FIG. 11 is a diagram 1100 illustrating an example of a hardware implementation for an apparatus 1002' employing a processing system 1114. The processing system 1114 may be implemented with a bus architecture, represented generally by the bus 1108. The bus 1108 may include any number of interconnecting buses and bridges depending on the specific application of the processing system 1114 and the overall design constraints. The bus 1108 links together various circuits including one or more processors and/or hardware components, represented by the processor 1104, the components 1004, 1006, 1008, 1010, 1012, 1014, and the computer-readable medium/memory 1106. The bus 1108 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1014. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' may include means for receiving the TDD configuration information for UL and DL transmissions by the apparatus 1002' from a base station. The means for receiving the TDD configuration information for UL and DL transmissions may be implemented by the configuration information for UL and DL transmission component 1004 and the reception component 1014. The apparatus 1002/1002' may include means for determining a maximum UL duty cycle based on the TDD configuration information. The means for determining a maximum UL duty cycle may be implemented by the maximum UL duty cycle determination component 1006. The apparatus 1002/1002' may include means for determining a transmit power for the UL transmission based on the maximum duty cycle of the UL transmission. The means for determining a transmit power for the UL transmission may be implemented by the transmit power determination component 1008. The apparatus 1002/1002' may include means for generating the MPE information for the UL transmit power determination. The means for generating the MPE information may be implemented by the MPE information component 1010. The apparatus 1002/1002' may include means for transmitting the UL transmissions to a base station. The means for transmitting the UL transmissions may be implemented by the transmission component 1012.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and/or the controller/processor 359. As such, in one configuration, the aforementioned means may be the TX Processor 368, the RX Processor 356, and/or the controller/processor 359 configured to perform the functions recited by the aforementioned means.

Figure 12:
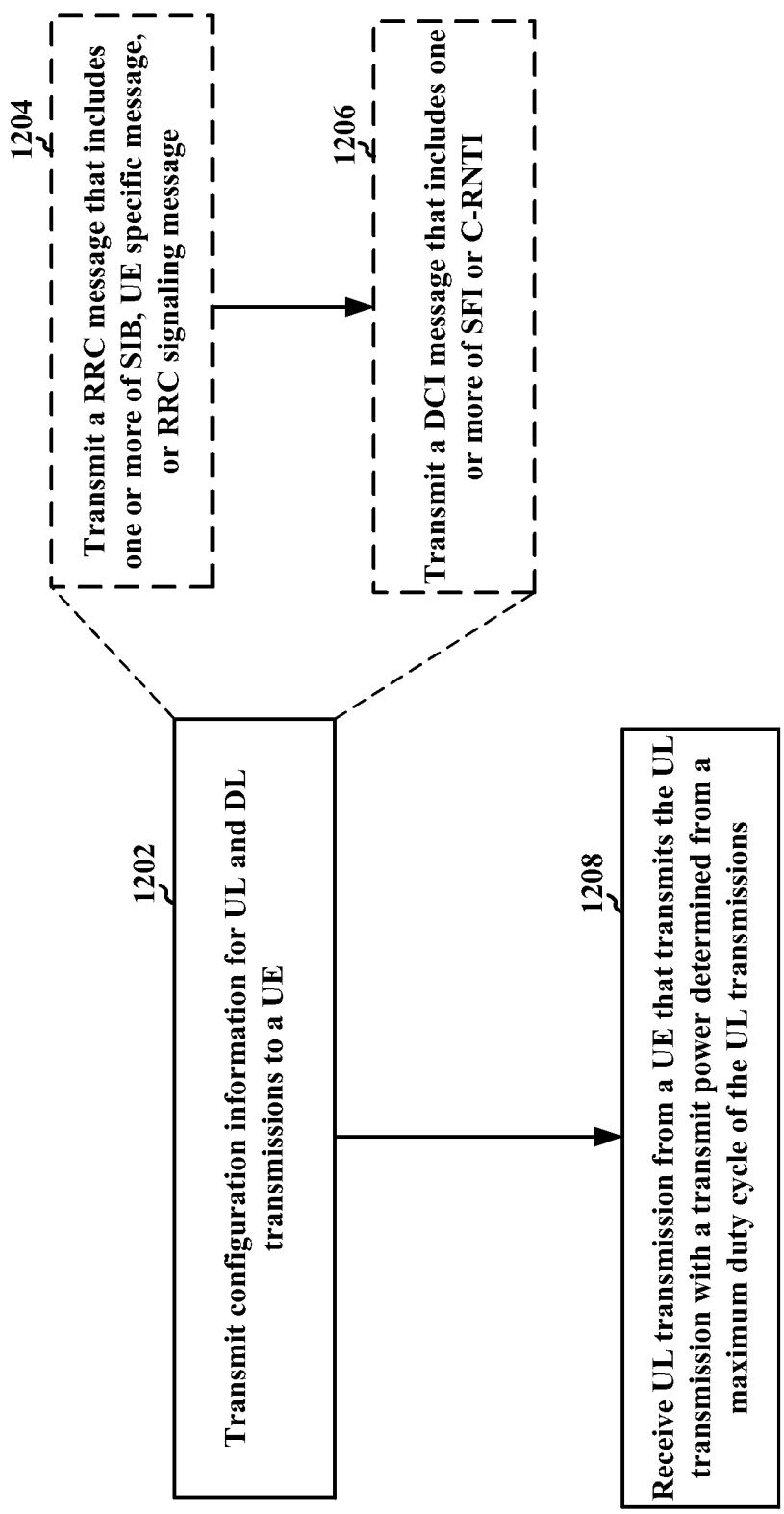
FIG. 12 is a flowchart of a method of wireless communication that may be implemented by a base station, in accordance with certain aspects of the disclosure.

FIG. 12 is a flowchart 1200 of a method of wireless communication. The method 1200 may be performed by a base station (e.g., the base station 102/180, the base station 310, the base station 402, the base station 502, the base station 604, the base station 1050, the apparatus 1302/1302', and/or the processing system 1414, which may include the memory 360 and which may be the entire UE 350 or a component of the UE 350, such as the TX processor 368, the RX processor 356, and/or the controller/processor 359). Optional aspects are illustrated with a dashed line. The example flowchart 1200 of FIG. 12 facilitates a UE to operate in accordance with an MPE limit and, thereby, alleviating uplink budget problems and/or range problems.

At 1202, the base station may transmit TDD configuration information for UL and DL transmissions to a UE. For example, a configuration information for UL and DL transmissions component 1304 and/or a transmission component 1310 of apparatus 1302 may facilitate the transmitting of the TDD configuration information for UL and DL transmissions. The configuration information may include signaling to configure a semi-static TDD pattern, to configure a dynamic TDD pattern, or signaling from which the transmission direction may be implied. For example, in one aspect, the TDD configuration information may include RRC signaling included in a SIB message that configures a semi-static cell-specific TDD pattern common for a UE and other UEs in the cell. The configuration information for the semi-static cell-specific TDD pattern may include a periodicity of the DL and UL transmissions, a number of DL slot, a number of DL symbols, a number of UL slots, and flexible slots or symbols that may be changed to UL or DL slots or symbols by dynamic TDD configuration signaling.

For example, at 1204, the base station may transmit a RRC message that includes one or more of SIB, UE specific message, or RRC signaling message. For example, an RRC signaling generation component 1306 may facilitate the transmitting of the RRC message. In one aspect, the RRC message may configures a semi-static UE-specific TDD pattern. The RRC message for the semi-static UE-specific TDD pattern may change the flexible slots or symbols allocated by the semi-static cell-specific TDD pattern to uplink slots or symbols. In one aspect, the RRC message may configures a periodic or semi-static DL and UL TDD pattern implicitly rather than explicitly.

At 1206, the base station may transmit a DCI message that includes one or more of SFI or C-RNTI. For example, a DCI generation component 1308 may facilitate the transmitting of the DCI message. In one aspect, the SFI may dynamically specify the number of UL symbols, the number of DL symbols, the number of flexible symbols, and the arrangement of the UL, DL, and flexible symbols on a slot-by-slot basis. In one aspect, the C-RNTI or DCI message may dynamically configures a DL and UL TDD pattern implicitly rather than explicitly.

At 1208, the base station may receive UL transmissions from a UE that transmits the UL transmissions with a transmit power determined from a maximum duty cycle of the UL transmissions. For example, an UL communication component 1314 and/or a reception component 1312 may facilitate the receiving of the UL transmissions from the UE that transmits the UL transmissions with the determined transmit power. In one aspect, the transmit power may be determined based on an average of power exposure over the TDD pattern periodicity to meet a MPE limit or EIRP limit.

In one aspect, if the TDD pattern includes two concatenated TDD sub-patterns and the UE may calculate the maximum duty cycle and the transmit power for the two TDD sub-patterns separately, the UE may transmit the UL transmission with a separate transmit power for the periodicities of the two separate TDD sub-patterns.

Figure 13:
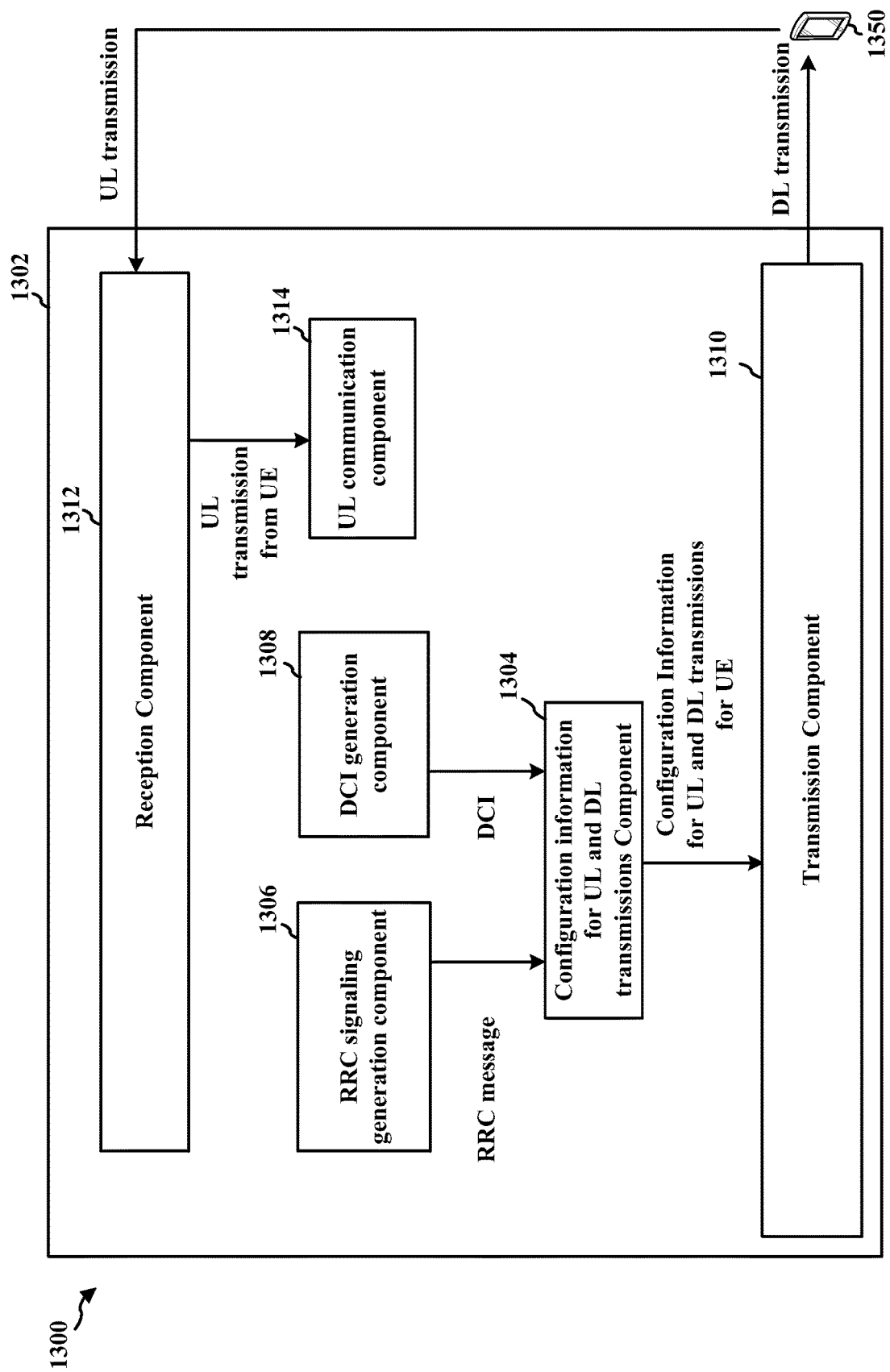
FIG. 13 is a conceptual data flow diagram illustrating the data flow between different means/components in an exemplary apparatus of a base station, in accordance with certain aspects of the disclosure.

FIG. 13 is a conceptual data flow diagram 1300 illustrating the data flow between different means/components in an example apparatus 1302 in communication with a UE 1350. The apparatus may be a base station. The apparatus 1302 may perform the method of flowchart 1200. The apparatus includes a configuration information for UL and DL transmissions component 1304, an RRC signaling generation component 1306, a DCI generation component 1308, a transmission component 1310, a reception component 1312, and an UL communication component 1314. The UE 1350 may include the same or similar components as shown with respect to the UE 104 of FIG. 1, the UE 350 of FIG. 3, the UE 404 of FIG. 4, the UE 504 of FIGS. 5A/5B, the UE 602 of FIG. 6, and/or the apparatus 1002/1002' of FIGS. 10 and/or 11.

The configuration information for UL and DL transmissions component 1304 may be configured to transmit TDD configuration information for UL and DL transmissions to a UE (e.g., as described in connection with 1204). The configuration information may include signaling to configure a semi-static TDD pattern, to configure a dynamic TDD pattern, or signaling from which the transmission direction may be implied. For example, in one aspect, the TDD configuration information may include RRC signaling included in a SIB message that configures a semi-static cell-specific TDD pattern common for a UE and other UEs in the cell. The configuration information for the semi-static cell-specific TDD pattern may include a periodicity of the DL and UL transmissions, a number of DL slot, a number of DL symbols, a number of UL slots, and flexible slots or symbols that may be changed to UL or DL slots or symbols by dynamic TDD configuration signaling. The configuration information for UL and DL transmissions component 1304 may be configured to transmit the TDD configuration information for UL and DL transmissions through the transmission component 1310 as DL transmissions to the UE 1350.

The RRC signaling generation component 1306 may be configured to generate the RRC signaling that includes one or more of SIB, UE specific message, or RRC signaling message (e.g., as described in connection with 1204). In one aspect, the RRC message may configures a semi-static UE-specific TDD pattern at a UE. The RRC message for the semi-static UE-specific TDD pattern may change the flexible slots or symbols allocated by the semi-static cell-specific TDD pattern to uplink slots or symbols. In one aspect, the RRC message may configures a periodic or semi-static DL and UL TDD pattern implicitly rather than explicitly.

The DCI generation component 1308 may be configured to generate a DCI message that includes one or more of SFI or C-RNTI (e.g., as described in connection with 1206). In one aspect, the SFI may dynamically specify the number of UL symbols, the number of DL symbols, the number of flexible symbols, and the arrangement of the UL, DL, and flexible symbols on a slot-by-slot basis. In one aspect, the C-RNTI or DCI message may dynamically configures a DL and UL TDD pattern at a UE implicitly rather than explicitly.

The transmission component 1310 may be configured to transmit various types of signals/messages and/or other information to other devices, including, for example, the UE 1350. For example, the transmission component 1310 may be configured to transmit a downlink transmission to the UE 1350 (e.g., as described in connection with 1202, 1204, and/or 1206).

The reception component 1312 may be configured to receive various types of signals/messages and/or other information from other devices, including, for example, the UE 1350. The messages/information may be received via the reception component 1312 and provided to one or more components of the apparatus 1302 for further processing and/or use in performing various operations. For example, the reception component 1312 may be configured to receive an uplink transmission from the UE 1350 (e.g., as described in connection with 1208).

The UL communication component 1314 may be configured to receive UL transmissions from a UE that transmits the UL transmissions with a transmit power determined from a maximum duty cycle of the UL transmissions (e.g., as described in connection with 1208). In one aspect, the transmit power may be determined based on an average of power exposure over the TDD pattern periodicity to meet a MPE limit or EIRP limit. The UL communication component 1314 may be configured to receive the UL transmission from the UE 1350 through the reception component 1312.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
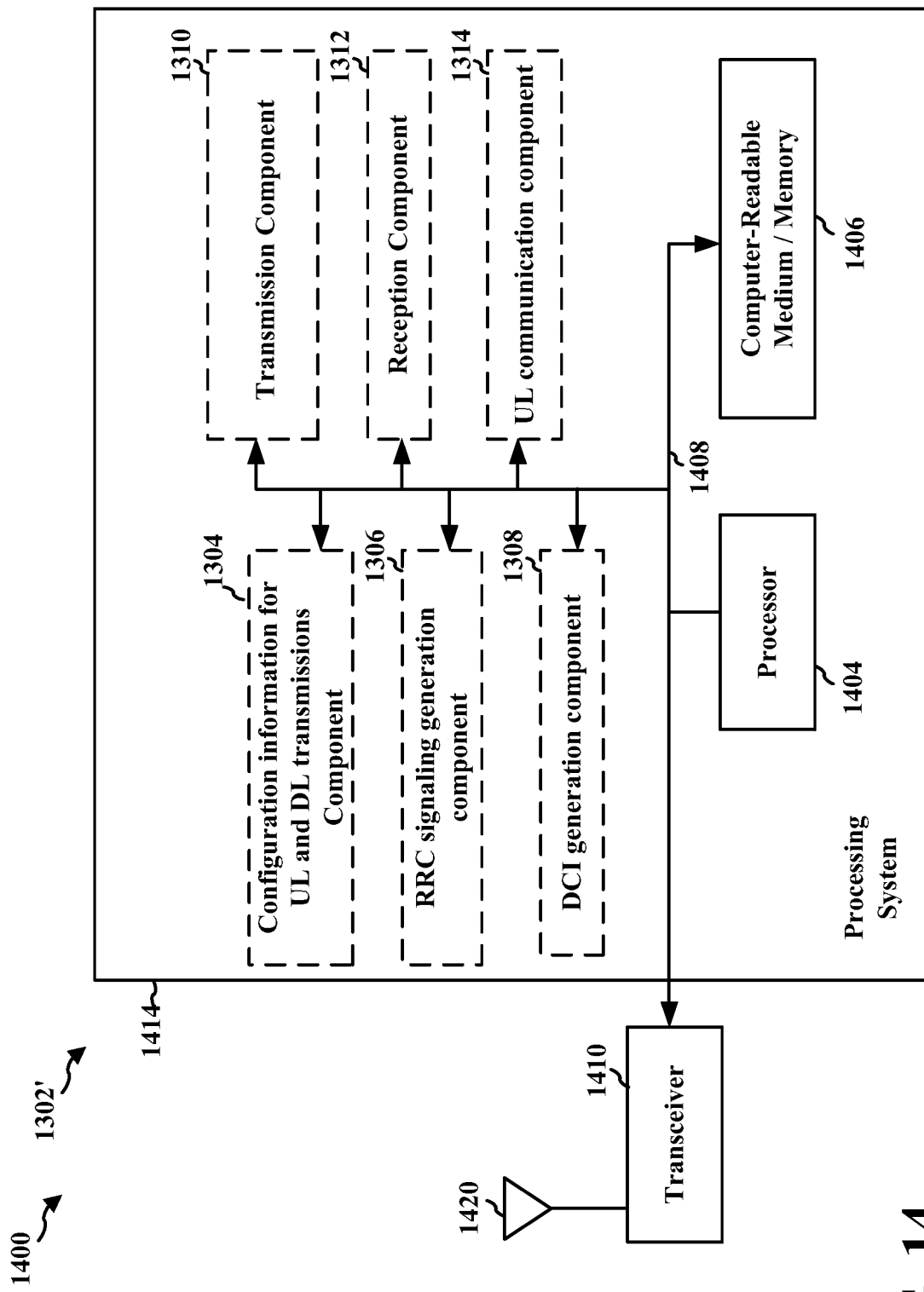
FIG. 14 is a diagram illustrating an example of a hardware implementation for an apparatus of a base station employing a processing system, in accordance with certain aspects of the disclosure.

FIG. 14 is a diagram 1400 illustrating an example of a hardware implementation for an apparatus 1302' employing a processing system 1414. The processing system 1414 may be implemented with a bus architecture, represented generally by the bus 1408. The bus 1408 may include any number of interconnecting buses and bridges depending on the specific application of the processing system 1414 and the overall design constraints. The bus 1408 links together various circuits including one or more processors and/or hardware components, represented by the processor 1404, the components 1304, 1306, 1308, 1310, 1312, 1314, and the computer-readable medium/memory 1406. The bus 1408 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1312. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and/or the controller/processor 375. Alternatively, the processing system 1414 may be the entire base station (e.g., see 310 of FIG. 3).

In one configuration, the apparatus 1302/1302' may include means for generating the RRC signaling that includes one or more of SIB, UE specific message, or RRC signaling message. The means for generating the RRC signaling may be implemented by the RRC signaling generation component 1306. The apparatus 1302/1302' may include means for generating a DCI message that includes one or more of SFI or C-RNTI. The means for generating the DCI message may be implemented by the DCI generation component 1308. The apparatus 1302/1302' may include means for transmitting TDD configuration information for UL and DL transmissions to a UE. The means for transmitting the TDD configuration information for UL and DL transmissions may be implemented by the configuration information for UL and DL transmissions component 1304 and the transmission component 1310. The apparatus 1302/1302' may include means for receive UL transmissions from a UE that transmits the UL transmissions with a transmit power determined from a maximum duty cycle of the UL transmissions. The means for receive the UL transmissions from a UE may be implemented by the UL communication component 1314 and the reception component 1312.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and/or the controller/processor 375. As such, in one configuration, the aforementioned means may be the TX Processor 316, the RX Processor 370, and/or the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    receiving configuration information indicating a time domain duplex (TDD) pattern for uplink (UL) and downlink (DL) transmissions that configures a set of time intervals into flexible time intervals and at least one of UL time intervals or DL time intervals, the flexible time intervals being allocable as one of the UL time intervals or the DL time intervals;
    determining a maximum duty cycle of an UL transmission based on the DL time intervals, the flexible time intervals, and the UL time intervals, wherein the TDD pattern comprises a plurality of TDD sub-patterns for the UL and DL transmissions and the maximum duty cycle is determined separately for each of the plurality of TDD sub-patterns; and
    determining a maximum UL transmit power for the UL transmission based on a power corresponding to a maximum permissible exposure (MPE) limit divided by the maximum duty cycle, wherein the maximum UL transmit power is: (i) less than the MPE limit over an averaging window of the TDD pattern, and (ii) greater than the MPE limit over a time period smaller than the averaging window and defined by the maximum duty cycle of the UL transmission.

2. The method of claim 1, wherein the configuration information specifies the TDD pattern for the UL and DL transmissions with a periodicity of the TDD pattern.

3. The method of claim 2, wherein the TDD pattern configures the UL time intervals as UL symbols for UL transmission, the DL time intervals as DL symbols for DL transmission, and the flexible time intervals as flexible symbols capable of being used for the UL transmission or the DL transmission.

4. The method of claim 3, wherein determining the maximum duty cycle of the UL transmission further comprises determining a quotient of a first sum divided by a second sum, wherein the first sum comprises a first duration of the UL symbols and the flexible symbols, and the second sum comprises a second duration of the UL symbols, the flexible symbols, and the DL symbols.

5. The method of claim 3, wherein the configuration information that specifies the TDD pattern of the UL symbols, the DL symbols, and the flexible symbols is received through a Radio Resource Control (RRC) message, and wherein the RRC message comprises at least one of a message in a System Information Block (SIB) that allocates the TDD pattern among the UL symbols, the DL symbols, and the flexible symbols, a UE specific message that allocates the TDD pattern among the UL symbols, the DL symbols, and the flexible symbols, or an RRC signaling message that indicates an UL direction or a DL direction of a symbol.

6. The method of claim 5, wherein the flexible symbols allocated by the SIB are changed to UL symbols for the UL transmission or DL symbols for the DL transmission by at least one of the UE specific message or a Downlink Control Information (DCI) message.

7. The method of claim 3, wherein the configuration information that specifies the TDD pattern of the UL symbols, the DL symbols, and the flexible symbols is received through a Downlink Control Information (DCI) message.

8. The method of claim 7, wherein the DCI message comprises at least one of a Slot Format Indicator (SFI) that allocates a slot among the UL symbols, the DL symbols, and the flexible symbols, or a Cell Radio Network Temporary Identifier (C-RNTI) that indicates an UL direction or a DL direction of a symbol.

9. The method of claim 3, wherein the plurality of TDD sub-patterns are concatenated, wherein each of the plurality of TDD sub-patterns allocates the UL symbols, the DL symbols, and the flexible symbols within respective ones of the plurality of TDD sub-patterns.

10. A method of wireless communication by a base station, comprising:
    transmitting, to a user equipment (UE), configuration information indicating a time domain duplex (TDD) pattern for uplink (UL) and downlink (DL) transmissions that configures a set of time intervals into flexible time intervals and at least one of UL time intervals or DL time intervals to allow the UE to determine a maximum duty cycle that is based on the DL time intervals, the flexible time intervals, and the UL time intervals, wherein the flexible time intervals are allocable as one of the UL time intervals or the DL time intervals, and wherein the TDD pattern comprises a plurality of TDD sub-patterns for the UL and DL transmissions for separate determination of the maximum duty cycle for each of the plurality of TDD sub-patterns; and
    receiving, from the UE, an UL transmission with a maximum UL transmit power that is based on a power corresponding to a maximum permissible exposure (MPE) limit divided by the maximum duty cycle, wherein the maximum UL transmit power is: (i) less than the MPE limit over an averaging window of the TDD pattern, and (ii) greater than the MPE limit over a time period smaller than the averaging window and defined by the maximum duty cycle of the UL transmission.

11. The method of claim 10, wherein the configuration information specifies the TDD pattern for the UL and DL transmissions with a periodicity of the TDD pattern.

12. The method of claim 11, wherein the TDD pattern configures the UL time intervals as UL symbols for UL transmission, the DL time intervals as DL symbols for DL transmission, and the flexible time intervals as flexible symbols capable of being used for the UL transmission or the DL transmission.

13. The method of claim 12, wherein the maximum duty cycle of the UL transmission comprises a quotient of a first sum divided by a second sum, wherein the first sum comprises a first duration of the UL symbols and the flexible symbols, and the second sum comprises a second duration of the UL symbols, the flexible symbols, and the DL symbols.

14. The method of claim 12, wherein transmitting the configuration information that specifies the TDD pattern of the UL symbols, the DL symbols, and the flexible symbols comprises transmitting a Radio Resource Control (RRC) message.

15. The method of claim 14, wherein the RRC message comprises at least one of a message in a System Information Block (SIB) that allocates the TDD pattern among the UL symbols, the DL symbols, and the flexible symbols, a UE specific message that allocates the TDD pattern among the UL symbols, the DL symbols, and the flexible symbols, or an RRC signaling message that indicates a UL direction or a DL direction of a symbol.

16. The method of claim 15, wherein transmitting the configuration information further comprises transmitting at least one of the UE specific message or a Downlink Control Information (DCI) message to change one or more of the flexible symbols allocated by the SIB to UL symbols for the UL transmission or DL symbols for the DL transmission.

17. The method of claim 12, wherein transmitting the configuration information that specifies the TDD pattern of the UL symbols, the DL symbols, and the flexible symbols comprises transmitting a Downlink Control Information (DCI) message.

18. The method of claim 17, wherein the DCI message comprises at least one of a Slot Format Indicator (SFI) that allocates a slot among the UL symbols, the DL symbols, and the flexible symbols, or a Cell Radio Network Temporary Identifier (C-RNTI) that indicates a UL direction or a DL direction of a symbol.

19. The method of claim 12, wherein the plurality of TDD sub-patterns are concatenated, wherein each of the plurality of TDD sub-patterns allocates the UL symbols, the DL symbols, and the flexible symbols within the respective TDD sub-patterns.

20. An apparatus for wireless communication at a user equipment (UE), comprising:
a memory; and
at least one processor coupled to the memory and configured to:
receive configuration information indicating a time domain duplex (TDD) pattern for uplink (UL) and downlink (DL) transmissions configures a set of time intervals into flexible time intervals and at least one of UL time intervals or DL time intervals, the flexible time intervals being allocable as one of the UL time intervals or the DL time intervals;
determine a maximum duty cycle of an UL transmission based on the DL time intervals, the flexible time intervals, and the UL time intervals, wherein the TDD pattern comprises a plurality of TDD sub-patterns for the UL and DL transmissions and determination of the maximum duty cycle is separate for each of the plurality of TDD sub-patterns; and
determine a maximum UL transmit power for the UL transmission based on a power corresponding to a maximum permissible exposure (MPE) limit divided by the maximum duty cycle, wherein the maximum UL transmit power is: (i) less than the MPE limit over an averaging window of the TDD pattern, and (ii) greater than the MPE limit over a time period smaller than the averaging window and defined by the maximum duty cycle of the UL transmission.

21. The apparatus of claim 20, wherein the configuration information specifies the TDD pattern for the UL and DL transmissions with a periodicity of the TDD pattern.

22. An apparatus for wireless communication, comprising:
a memory; and
at least one processor coupled to the memory and configured to:
transmit, to a user equipment (UE), configuration information indicating a time domain duplex (TDD) pattern for uplink (UL) and downlink (DL) transmissions that configures a set of time intervals into flexible time intervals and at least one of UL time intervals or DL time intervals to allow the UE to determine a maximum duty cycle that is based on a quotient of a first sum of at least the UL time intervals and the flexible time intervals and a second sum of at least the DL time intervals, the flexible time intervals, and the UL time intervals, wherein the flexible time intervals are allocable as one of the UL time intervals or the DL time intervals, and wherein the TDD pattern comprises a plurality of TDD sub-patterns for the UL and DL transmissions for separate determination of the maximum duty cycle for each of the plurality of TDD sub-patterns; and
receive, from the UE, an UL transmission with a maximum UL transmit power that is based on a power corresponding to a maximum permissible exposure (MPE) limit divided by the maximum duty cycle, wherein the maximum UL transmit power is: (i) less than the MPE limit over an averaging window of the TDD pattern, and (ii) greater than the MPE limit over a time period smaller than the averaging window and defined by the maximum duty cycle of the UL transmission.

* * * * *